United States Patent
Seligson et al.

(10) Patent No.: US 9,549,385 B2
(45) Date of Patent: *Jan. 17, 2017

(54) CONFIGURATION OF NETWORKS USING CLIENT DEVICE ACCESS OF REMOTE SERVER

(71) Applicant: Avaya Inc, Santa Clara, CA (US)

(72) Inventors: John Seligson, El Dorado Hills, CA (US); Zenon Kuc, San Jose, CA (US); John Mead, Fremont, CA (US)

(73) Assignee: Avaya Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/656,639

(22) Filed: Mar. 12, 2015

(65) Prior Publication Data
US 2015/0271022 A1 Sep. 24, 2015

Related U.S. Application Data

(60) Provisional application No. 61/969,242, filed on Mar. 23, 2014.

(51) Int. Cl.
*H04W 60/04* (2009.01)
*H04L 12/46* (2006.01)
(Continued)

(52) U.S. Cl.
CPC .......... *H04W 60/04* (2013.01); *H04L 12/4679* (2013.01); *H04L 12/6418* (2013.01);
(Continued)

(58) Field of Classification Search
CPC .. H04L 12/46; H04L 12/6418; H04L 41/0806; H04L 41/082; H04L 45/12; H02B 60/43
See application file for complete search history.

(56) References Cited

U.S. PATENT DOCUMENTS 6,857,009 B1 * 2/2005 Ferreria ............... H04L 69/163
370/401
8,416,789 B1 4/2013 Busch
(Continued)

FOREIGN PATENT DOCUMENTS

| EP | 1705869 A1 | 9/2006 |
|---|---|---|
| EP | 2573976 A2 | 3/2013 |
| WO | 2013097609 A1 | 7/2013 |

OTHER PUBLICATIONS

European Patent Office. Extended European Search Report for related European Patent Application No. 15160400.6. 5 pages. Jul. 20, 2015.

(Continued)

*Primary Examiner* — Ian N Moore
*Assistant Examiner* — Mewale Ambaye
(74) *Attorney, Agent, or Firm* — IP Spring

(57) ABSTRACT

Implementations relate to configuration of networks using client device access of a remote server. In some implementations, a method includes requesting a management server from an end device for shortest path bridging (SPB) configuration information for the end device to communicate on an SPB network, where the end device communicates with the management server over a non-SPB connection. The SPB configuration information is received from the management server, and the SPB configuration information is sent to an edge configuration device connected to the end device, where the SPB configuration information causes configuration of the edge configuration device to allow communication of the end device on the SPB network.

13 Claims, 12 Drawing Sheets

(51) Int. Cl.
*H04L 12/24* (2006.01)
*H04L 12/64* (2006.01)
*H04L 12/721* (2013.01)

(52) U.S. Cl.
CPC ........ *H04L 41/082* (2013.01); *H04L 41/0806* (2013.01); *H04L 45/12* (2013.01); *H04L 45/66* (2013.01)

(56) References Cited

U.S. PATENT DOCUMENTS

| | | | |
|---|---|---|---|
| 8,804,722 B2* | 8/2014 | Appalla | H04L 12/1836 370/390 |
| 2008/0032738 A1 | 2/2008 | Boyer et al. | |
| 2011/0007667 A1 | 1/2011 | Takacs et al. | |
| 2011/0019678 A1 | 1/2011 | Mehta et al. | |
| 2012/0106347 A1 | 5/2012 | Allan | |
| 2013/0077625 A1 | 3/2013 | Khera et al. | |
| 2013/0077626 A1 | 3/2013 | Keesara et al. | |
| 2013/0080602 A1 | 3/2013 | Keesara et al. | |
| 2013/0301607 A1 | 11/2013 | McCann et al. | |
| 2013/0325934 A1 | 12/2013 | Fausak et al. | |
| 2014/0355436 A1* | 12/2014 | Zhang | H04L 47/10 370/232 |
| 2014/0372576 A1 | 12/2014 | Mohandas | |
| 2014/0376558 A1 | 12/2014 | Rao et al. | |
| 2015/0095449 A1 | 4/2015 | Kuc et al. | |
| 2015/0188780 A1* | 7/2015 | Spieser | H04L 41/5009 370/252 |

OTHER PUBLICATIONS

European Patent Office. Extended European Search Report for related European Patent Application No. 151604022.2. 5 pages. Jul. 30, 2015.

European Patent Office. Extended European Search Report for related European Patent Application No. 15160405.5. 4 pages. Aug. 3, 2015.

International Patent Office; Patents Directorate, South Wales, Search Report mailed Jun. 20, 2014 cited in corresponding GB1322639.4.

International Patent Office; Patents Directorate, South Wales, Search Report mailed Jun. 20, 2014 cited in corresponding GB1322638.6.

International Patent Office; Patents Directorate, South Wales, Search Report mailed Jun. 23, 2014 cited in corresponding GB1322635.2.

USPTO; Non-final Office Action U.S. Appl. No. 14/041,173; dated Dec. 24, 2014; 7 Pages.

USPTO, Non-final Office Action for U.S. Appl. No. 14/656,622, Feb. 2, 2016, 15 pages.

USPTO, Notice of Allowance for U.S. Appl. No. 14/656,629, Sep. 1, 2016, 14 pages.

USPTO, Non-final Office Action for U.S. Appl. No. 14/656,622, Aug. 1, 2016, 17 pages.

\* cited by examiner

| ESD | VLAN/ISID bindings | |
|---|---|---|
| | pending | approved |
| local | | |
| remote | | |

| ECD | VLAN/ISID bindings | |
|---|---|---|
| | pending | approved |
| local | | |
| remote | | |

FIG. 6

| ESD | VLAN/ISID bindings | |
|---|---|---|
| | pending | approved |
| local | | |
| remote | | |

| ECD | VLAN/ISID bindings | |
|---|---|---|
| | pending | approved |
| local | 6/600 | |
| remote | | |

FIG. 7

| ESD | VLAN/ISID bindings | |
|---|---|---|
| | pending | approved |
| local | | |
| remote | 6/600 (ECD) | |

| ECD | VLAN/ISID bindings | |
|---|---|---|
| | pending | approved |
| local | 6/600 | |
| remote | | |

FIG. 8

| ESD | VLAN/ISID bindings | |
|---|---|---|
| | pending | approved |
| local | | |
| remote | | 6/600 (ECD) |

| ECD | VLAN/ISID bindings | |
|---|---|---|
| | pending | approved |
| local | 6/600 | |
| remote | | |

FIG. 9

| ESD | VLAN/ISID bindings | |
|---|---|---|
| | pending | approved |
| local | | |
| remote | | 6/600 (ECD) |

| ECD | VLAN/ISID bindings | |
|---|---|---|
| | pending | approved |
| local | | 6/600 |
| remote | | |

FIG. 10

CONFIGURATION OF NETWORKS USING CLIENT DEVICE ACCESS OF REMOTE SERVER

CROSS REFERENCE TO RELATED APPLICATIONS

The present application claims priority to U.S. Provisional Application No. 61/969,242, entitled, "Automatic Edge Device Attachment in Fabric Topology Networks," filed Mar. 23, 2014, and which is incorporated herein by reference in its entirety.

The following commonly owned, co-pending United States Patent Applications, including the present application, are related to each other. Each of the other patents/applications are incorporated by reference herein in its entirety:

U.S. patent application Ser. No. 14/041,173, entitled "Message Transmission in Networks," filed Sep. 30, 2013;

U.S. patent application Ser. No. 14/041,342, entitled "Enabling Configuration in Networks," filed Sep. 30, 2013;

U.S. patent application Ser. No. 14/041,242, entitled "Enabling Encapsulation in Networks," filed Sep. 30, 2013;

U.S. patent application Ser. No. 14/656,604, entitled "Configuration of Networks with Server Cluster Device," filed Mar. 12, 2015;

U.S. patent application Ser. No. 14/656,622, entitled "Authentication of End Devices in Networks," filed Mar. 12, 2015; and U.S. patent application Ser. No. 14/656,629, entitled "Configuration of Networks using Switch Device Access of Remote Server," filed Mar. 12, 2015.

BACKGROUND

Communication networks are widely used to provide communication between different computer systems and other electronic devices. Wireless communication networks offer increased convenient access to client devices, such as computers, phones, tablets, wearable devices, and other devices, by allowing network communications between these devices without the need for wired connections. Some network devices such as servers can perform configuration in a network system provide connected devices access to one or more virtual local area networks (VLANs) and other network functionality. Conventionally, an authentication process and configuration process for connected devices is extensive and typically requires much time and expertise from a network administrator.

SUMMARY

Implementations of the present application relate to configuration of networks using client device access of a remote server. In some implementations, a method includes requesting a management server from an end device for shortest path bridging (SPB) configuration information for the end device to communicate on an SPB network, where the end device communicates with the management server over a non-SPB connection. The SPB configuration information is received from the management server, and the SPB configuration information is sent to an edge configuration device connected to the end device, where the SPB configuration information causes configuration of the edge configuration device to allow communication of the end device on the SPB network.

Various implementations and examples of the above method are described. For example, the requesting for SPB configuration information can be performed by the end device upon connection of the end device to the SPB network. The requesting for SPB configuration information can include sending identity information to the management server, the identity information identifying the end device or one or more users associated with the end device. The end device can be a non-SPB device that is not compatible with the SPB network and can include a fabric attach agent for processing networking configuration messages, and the edge configuration device can also include a fabric attach agent. The SPB configuration information received from the management server can include one or more VLAN/ISID bindings for the end device. The configuring of the edge configuration device can include creating one or more VLANs for the end device on the edge configuration device as indicated by the SPB configuration information, and creating one or more port memberships of the one or more VLANs for the end device. The configuring of the SPB network for the end device can include establishing port tagging status on one or more ports of the edge configuration device connected to an edge server device. In some examples, the end device can communicate with the management server over a wireless network and can register with the management server.

In some implementations, a system can include a storage device and at least one processor accessing the storage device and operative to perform operations. The operations can include various operations similar to the features described above for the method. Some implementations can provide a computer program product comprising a computer-readable medium including program instructions to be implemented by a device connected to a communication network, the program instructions performing various operations similar to the features described above for the method.

BRIEF DESCRIPTION OF THE DRAWINGS

FIGS. 6-10 illustrate example binding lists, according to some implementations.

DETAILED DESCRIPTION

Figure 1:
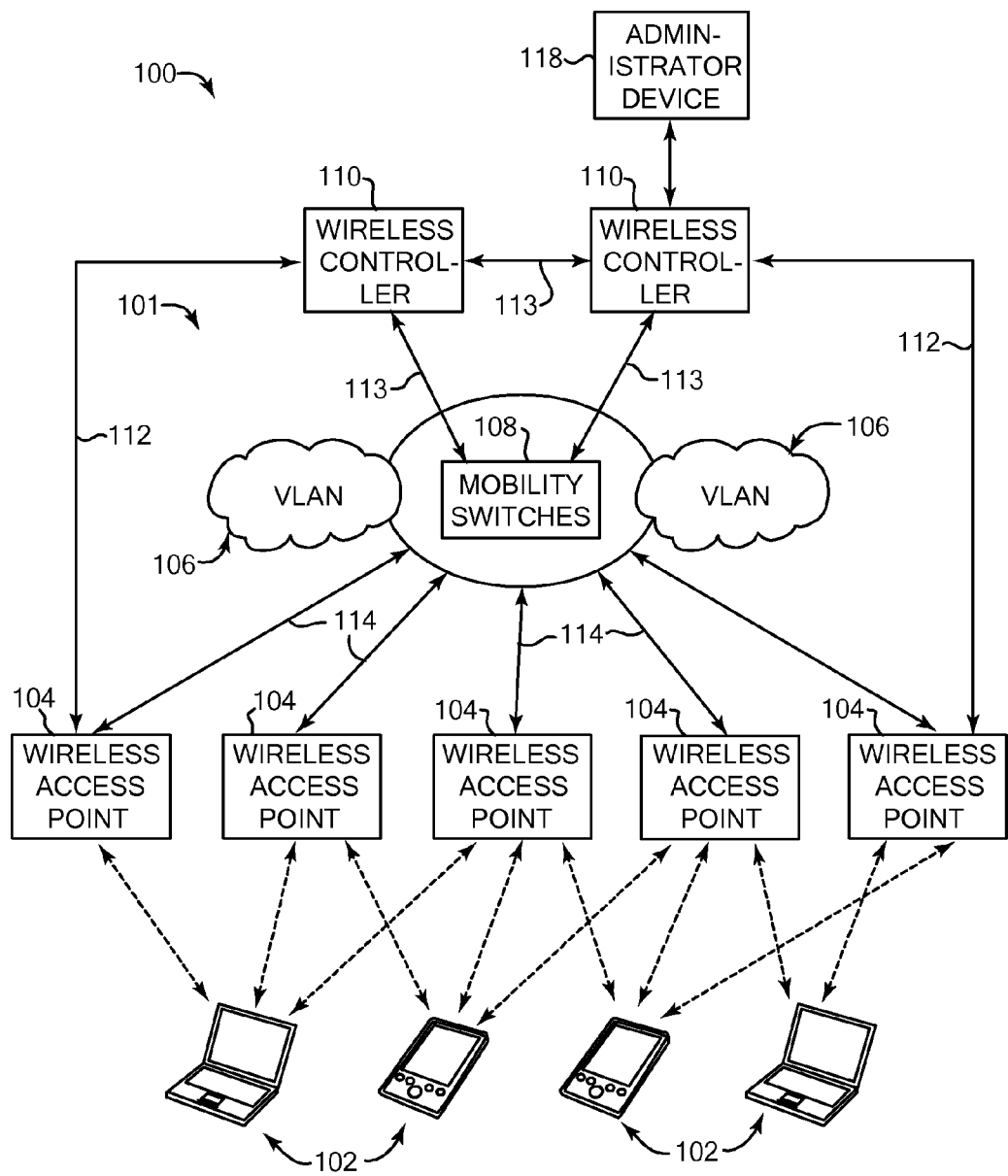
FIG. 1 illustrates a block diagram depicting an example network environment, which may be used to implement some implementations described herein.

Implementations described herein facilitate authentication of end devices for network access and configuration of a network for end devices. Some implementations can provide automatic authentication of end devices for access to a network, by having an edge configuration device (e.g., a switch) access a remote source such as an authorization server. Some implementations can provide automatic configuration of network devices to provide access to features of a network by an end device, by having an edge configuration device access a remote source such as an access control server for configuration information. Some implementations can provide automatic configuration of network devices to provide access to features of a network by an end device, by having an end device access a remote source such as a management server for configuration information. In some implementations, a server cluster device including multiple peer server devices can receive configuration information from a device such as an edge configuration device, and can synchronize the configuration of the peer server devices to allow network access for an end device.

Implementations described herein can enable network devices that are not compatible with a particular network standard to take advantage of the infrastructure of a network utilizing that network standard. In some implementations, the network can be a fabric topology network. For example, a network device compatible with a shortest path bridging (SPB) fabric standard can support various SPB functions including MAC-in-MAC encapsulation/decapsulation and service identification using service identifiers (ISIDs). However, devices directly connecting to such a network device may not be compatible or support SPB functions and therefore cannot take advantage of the SPB infrastructure. Using features described herein, such a non-SPB compatible device can take advantage of such an SPB infrastructure with reduced user/administrator effort and support.

Further, some features described herein allow non-SPB devices to be authenticated and configured for SPB connectivity automatically, without requiring a network administrator or other user to manually input configuration information or other information to network devices to authorize a particular end device and/or configure a network for a particular end device.

For example, some described features can enable configuration of an SPB network to include a non-SPB end device in the SPB functionality of the network automatically upon connection of the end device to an edge configuration device. Functions such as ISID and VLAN assignment can automatically be configured on the network for the end device using fabric attach messages. Using features described herein, this configuration can be performed even if the end device is not compatible with fabric attach messages used for sending configuration information to devices on the network.

For example, some features allow an edge configuration device to automatically obtain authentication and configuration information for a non-SPB end device from a remote source upon connection of the end device to the edge configuration device. For example, the remote source can be an access control server that can include or communicate with an authentication server, allowing an edge configuration device to automatically determine whether an end device is authenticated for use on the SPB network. The edge configuration device can send obtained configuration information to an edge server device for creation of one or more VLANs of the SPB network for the end device, port assignment for created and/or established VLAN(s), port tagging, etc. Thus, an edge server device and/or edge configuration device need not be manually fed configuration information to provide such network configuration for end devices. Some features allow an end device to automatically obtain configuration information from a remote source. For example, the end device can contact a management server and receive configuration information, and the end device can send this configuration information to a connected edge configuration device for configuration of VLANs for the end device on the SPB network, e.g., using fabric attach messages. Thus, configuration information need not be manually input to the edge server device or edge configuration device to configure the network for the end device.

Some features allow a server cluster device to automatically configure the SPB network for an end device using fabric attach messages as described herein. For example, a server cluster including multiple peer server devices can receive configuration information from a device such as an edge configuration device, and each peer server device can send information to the other peer server device to synchronize the configuration of the peer server devices. Such features allow server cluster devices to provide automatic configuration of the network for non-SPB end devices based on received configuration information.

FIG. 1 is a block diagram of an example network system 100 which can be used with some implementations described herein. The network system 100 may include a network 101 providing communication links between multiple devices connected to the network. Network 101 can include any type of network that connects devices, such as a wide area network (WAN), local area network (LAN), wireless network, or others types of networks. Any one or more networking standards can be used for network 101, such as Ethernet, common wireless networking standards, etc. In various implementations described herein, a wireless network can be used for at least a portion of the network 101.

Client devices 102 can be operated by users and can communicate with other client devices 102 as well as other devices via the network 101. In various implementations, the client devices 102 can include wireless transmitters and receivers (e.g., transceivers, or radios) that allow them to communicate signals wirelessly with other devices that also have this capability. Each client device 102 can be any of a variety of types of devices. For example, in some implementations, client devices 102 can be implemented as desktop computers, laptop computers, tablet computers, portable devices, cell phones, media players, wearable devices (e.g., glasses device, wristwatch device, etc.), entertainment devices (television, disc player, stereo), mainframe computer, peripherals (printer, scanner, sensors), or other electronic devices.

Wireless access points 104 are devices that allow other wireless-capable devices to connect to a communication network and communicate with each other. The wireless access points 104 can transmit and receive wireless communication signals to and from other devices having compatible wireless communication functionality. In the example system 100, the wireless access points 104 can transmit wireless signals to the client devices 102 via one or more wireless protocols, and can receive wireless signals from client devices 102 via such protocols. Some examples of current suitable wireless protocols include those protocols defined under IEEE 802.11. Other protocols can also be used. Thus, the client devices can communicate all data traffic via wireless access points 104 in range of the clients' transmitters and receivers.

Wireless access points 104 are connected to other network devices provided in network 101. The access points 104 can be used to communicate data traffic to and from client devices 102 through the network. The wireless access points 104 can send data traffic from client devices 102 to other network devices to send the traffic to the desired network destination. They can also receive data traffic from other devices via the network devices to provide to the client devices 102. Any of a variety of different wireless network topologies, devices, and functions can be used. For example, in some implementations, multiple virtual local area networks (VLANs) 106 can be provided, which provide partitions for client devices connected to the network 101 into distinct domains that are isolated from each other. Some implementations can provide communication between VLANs using mobility switches 108. For example, the wireless access points 104 can be connected (e.g., via wired connection such as Ethernet) to mobility switches 108, which can implement mobility tunnels. Such mobility tunnels allow client devices 102 to communicate via particular VLANs 106 associated with particular wireless access points 104 with which the client devices 102 are communicating. Various implementations can include different kinds of switches, hubs, routers, and other types of network devices in the network 101.

One or more wireless access controllers 110, referred to herein also as controllers or wireless controllers, can be included in system 100. Controllers 110 are devices used to manage, control and/or configure wireless access points 104, mobility switches 108, VLANs 106, and/or other network devices or structures connected to the network 101. In some implementations, multiple controllers 110 can be used as shown, where each controller 110 can be associated with a different VLAN 106 and/or set of wireless access points 104. In some examples, if a client device 102 communicates with a wireless access point 104 that is associated with a first controller 110, and the client device then "roams" to communicate with a different wireless access point 104 associated with a second controller 110, the first controller 110 can provide the necessary information to the second controller 110 to maintain the client connection.

In some described implementations, the wireless controllers 110 can configure the wireless access points 104 with changed or new functionality. For example, the controllers 110 can send (or cause to be sent) a firmware image or other software image or code as an upgrade to one or more selected wireless access points 104. Controllers 110 can also select or apply particular settings or functions on wireless access points 104 or other devices connected to the network. Controllers 110 also receive information from connected devices including wireless access points 104, such as status information regarding the settings and status of various functions of the wireless access points 104 (e.g., data communication, transmission, reception, readiness, etc.). In some implementations, communication between the controllers 110 and the wireless access points 104 can be provided on dedicated control connections 112 (which can connect appropriate controllers 110 to all the wireless access points 104), where the dedicated control connections 112 can be separate from the connections 114 used to transmit client data traffic between the wireless access points 104 and VLANs 106. In other implementations, the wireless controllers 110 can communicate with the wireless access points 104 via connections 114 instead of or in addition to communication over dedicated control connections 112. Controllers 110 can also communicate control information with mobility switches 108 and with each other via other control connections 113.

In some example implementations, an initializing wireless access point 104 discovers a wireless controller 110 using a discovery protocol and establishes a control channel with the controller 110 (e.g., associates with one of the controllers). During its operation, the access point 104 reports monitoring information to the associated controller 110. A wireless access point 104 may also (e.g., periodically) scan the air and report any neighboring access points to its associated controller 110. For example, the access point can collect the operating channel and receiver power information of each neighboring access point it detects and can send it to its controller 110.

The configuration for the wireless access point 104 is defined on the controller 110 and can be sent to the wireless access 104 point after the wireless access point 104 associates with controller 110 over the control channel. For example, access point profiles stored by the controller 110 can be used to define the access point configuration for different access points. The wireless access point 104 is configured according to the received configuration from the controller, 110 such as a set of configuration instructions.

In some example implementations, the configuration can include a software upgrade as described above. The upgrade image can be stored on storage local to the associated controller 110 or can be stored on one or more separate servers in communication with the wireless access point 104 to be configured. For example, a wireless access point 104 can download a software image from a server using a standard protocol such as HTTP or TFTP. The upgrade image can be controlled and triggered by a wireless controller 110, such that the controller sends a request to the wireless access point 104 to download and install the software image. For example, the wireless access point 104 can save the received software image in a non-volatile memory partition. After the wireless access point 104 has downloaded the image, it restarts (e.g., reboots) to initialize and operate with the new image. After restart, the access point can go through the discovery procedure to find and establish a connection with a wireless controller 110. At that point, the wireless access point 104 is ready to service client data traffic.

An administrator device 118 connects to one or more of the wireless controllers 110 to communicate with the controller. For example, the administrator device 118 can receive status information regarding the controller 110 and/or the network 101. The administrator device 118 can also manage the network 101 by sending commands and data to various network devices such as the controllers 110 to configure the controller and/or configure other devices connected to the network 101 via the controller 110. An administrator or other user operating the administrator device 118, for example, can send a command to cause a configuration of designated access points as described above. The administrator device 118 can be connected to the network 101 via any type of network connection. For example, in some implementations, a wireless management service can use a web-based front end to provide a user access to the network.

A software application stored in a memory or computer-readable storage medium provides instructions that enable a processor to perform these functions and other functions described herein.

In some implementations, client devices can be connected to the network 101 via wired connections instead of or in addition to wireless links. For example, wired Ethernet links can be used.

Although implementations described herein are described in the context of one or two edge configuration devices and one edge server device, one of ordinary skill in the art will readily recognize that there could be any number of edge configuration devices and edge server devices.

Figure 2:
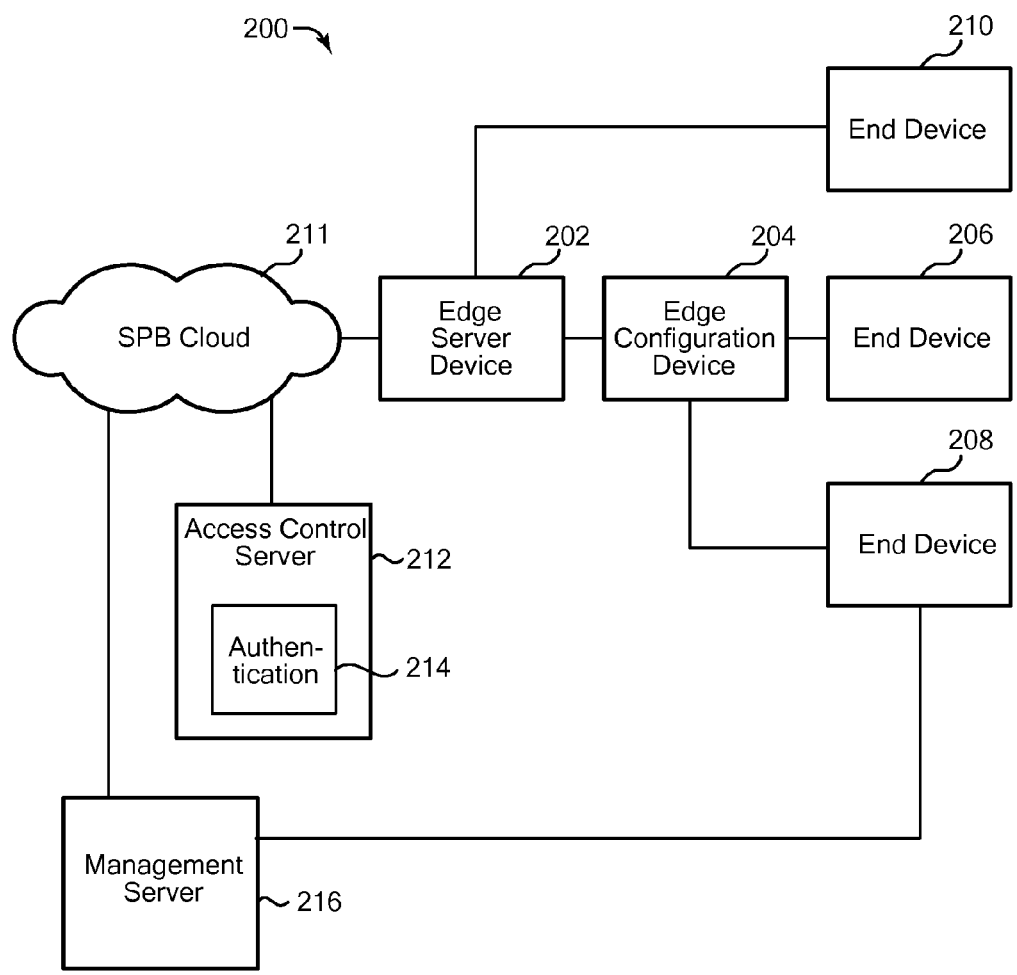
FIG. 2 illustrates a block diagram depicting an example network system which may be used to implement some implementations described herein.

FIG. 2 illustrates a block diagram depicting an example system 200 which may be used to implement some implementations described herein. System 200 includes an edge server device 202, an edge configuration device 204, and end devices 206, 208, and 210. In various implementations, edge configuration device 204 couples to end device 206 and end device 208, which may also be referred to as client devices. The edge configuration device 204 is also coupled to the edge server device 202 which is in turn coupled to an SPB cloud 211. Shortest Path Bridging (SPB) (including such versions as Shortest Path Bridging-MAC, SPBM, SPBV), which is specified in the IEEE 802.1aq standard, is a computer networking technology that simplifies the creation and configuration of networks, while enabling multipath routing. One or more end devices such as end device 210 can also be coupled directly to edge server device 202, e.g., without an intermediate connection to edge configuration device 204. As shown in FIG. 2, edge configuration device 204, edge server device 202, and the end devices are separate devices.

The system 200 can be used to extend the edge of SPB cloud (fabric) 211 to additional devices such as end devices 206, 208, and 210. To "extend" the SPB fabric edge, VLAN/ISID bindings should be supported on non-SPB (e.g., non-SPBM) devices, which are network devices not compatible with SPB network standards. VLAN/ISID bindings are mappings of a service identifier (ISID) to a Virtual Local Area Network (VLAN) identifier. Fabric attach devices as described herein can automatically discover each other and exchange configuration data to support fabric edge extension. For example, fabric attach devices can send and process VLAN/ISID bindings and requests to map these identifiers to each other for the SPB network. Fabric attach devices pass VLAN/ISID bindings to attached SPB nodes (such as an edge server device) where the bindings are processed and either approved or rejected. Specific actions can be taken on the non-SPBM devices (such as an edge configuration device or end device), as well as the SPBM device, based on the outcome of the mapping request.

"Fabric attach" as referred to herein can refer to the ability of a device to extend the edge of the SPB network to devices (e.g., non-SPB devices) that are not compatible with protocols or communication standards used for configuring those devices on the SPB network (e.g., not compatible with SPB standards, including SPBM, SPBV (shortest path bridging VID (VLAN ID)), etc.). For example, in some implementations a fabric attach agent, such as a procedure implemented in software and/or hardware, can run on a fabric attach device (such as a fabric attach server or fabric attach switch/proxy) and perform fabric attach features as described herein. For example, a fabric attach agent can understand and send fabric attach messages (including configuration information) used between fabric attach devices to configure a device for communication with the SPB network. For example, in some implementations described herein, fabric attach messages can use the LLDP protocol and include particular TLVs (type-length-value fields).

In some implementations, edge server device 202 may also be referred to as a fabric attach server (FA server). In various implementations, edge server device 202 is an SPB network node that creates VLANs on ports between the edge configuration device 204 and the edge server device 202, creates a user network interface (UNI) associating ISIDs with created VLANs, performs MAC-in-MAC encapsulation functions, performs intermediate system-to-intermediate system (IS-IS) configuration, adds ISID fields to packets during MAC-in-MAC encapsulation, performs MAC-in-MAC decapsulation, etc. For example, in switched UNI mode, the VLAN/ISID mapping is per port of the edge server device. In C-VLAN UNI mode, the VLAN/ISID mapping is per device (e.g., all ports of a device).

An edge server device 202 can exchange information not only with other edge server devices but also with one or more edge configuration devices. In some implementations, edge server device 202 advertises its VLAN/ISID bindings per edge configuration device. As such, for example, edge server device 202 may send a different LLDP message to each edge configuration device. In some implementations, edge server device 202 may operate in customer VLAN (C-VLAN) user network interface mode and switched UNI mode simultaneously.

Edge configuration device 204 may also be referred to as a fabric attach proxy (FA proxy), fabric attach switch (FA switch), or fabric attach host (FA host). In some implementations, the edge configuration device can be a switch, router, or other network device operative to communicate on the network via ports. In some implementations, the edge configuration device 204 is a non-SPB network device running a fabric attach agent. In various implementations, edge configuration device 204 can receive SPB configuration information in fabric attach messages, after which edge configuration device 204 sends the SPB configuration information to edge server device 202 in fabric attach messages to approve the configuration information and allow the edge server device 202 to create VLANs. For example, in various implementations, edge configuration device 204 adds a VLAN tag, and/or VLAN/ISID bindings, to a packet that is sent to the edge server device 202. In some implementations, edge server device 202 can use that information to perform MAC-in-MAC encapsulation. The edge configuration device 204 can create VLANs in its own memory based on the SPB configuration information after the edge server device 202 has sent its approval of the SPB configuration information.

In some implementations, each of the edge server device 202 and the edge configuration device 204 has a command-line interface (CLI), also referred to as a command-line user interface. A CLI enables a user to interact with a computer program where the user/customer/client issues commands to a program in the form of successive lines of text (command lines).

End device 206, end device 208, and other end devices are coupled to access ports of the edge configuration device 204. Some end devices such as end device 210 can be coupled to one or more ports of edge server device 202 without an intermediate connection to an edge configuration device 202. Possible end devices may include wireless access points, mobile devices such as smart phones, tablet computers, and wearable devices, cameras, laptop computers, desktop computers, and other client devices. In some implementations, a fabric attach end device can be a non-SPB device that supports some form of VLAN/ISID binding definition and, if connectivity permits, has the ability to advertise this data to a directly connected fabric attach edge configuration device 204 (e.g., with external end device support enabled) or fabric attach edge server 202. Non-fabric attach end devices may not support such binding definitions directly.

Implementations described herein can enable configuration of an SPB network to include a non-SPB end device 206 in the SPB functionality of the network automatically upon connection of the end device 206 to one or more ports of the edge configuration device 204. Functions such as ISID usage can be configured on the network for the end device 206 using the fabric attach messages described herein. This configuration can be performed even if the end device 206 is not compatible with protocols or communication standards used for fabric attach configuration devices on the SPB network (e.g., not compatible with fabric attach messages and not having a fabric attach agent running on them).

For example, as described in greater detail below, in some implementations the edge configuration device 204 can obtain authentication and configuration information for an end device 206 from a source such as an access control server 212 connected to the SPB cloud 211. The access control server 212 can include or be in communication with an authentication server or module 214, e.g., the access control server 212 can act as an authentication server for authentication of an end device. The edge configuration device 204 can send the configuration information to the edge server device 202 for creation of one or more VLANs of the SPB network for the end device, port assignment for created and/or established VLAN(s), port tagging, etc. Some examples of such implementations are described in greater detail below with respect to FIGS. 11 and 12.

In some implementations, a management server 216 is connected to the SPB cloud or is connected to another network. The end device 208 can communicate directly with a management server 216 to obtain configuration information from that server (and the management server 216 can authenticate the end device 208, e.g., via the authentication module 214), and then the end device 208 can send that configuration information to the edge configuration device 204 using fabric attach messages to cause the configuration of the end device on the SPB network. Some examples of such implementations are described in greater detail below with respect to FIG. 13.

For ease of illustration, some implementations are described herein in the context of one edge server device, one edge configuration device, and one end device. These implementations and others also apply to multiple edge server devices, multiple edge configuration devices, and/or multiple end devices.

In some implementations, an edge configuration device can connect to a server cluster device, e.g., a single logical server that includes two peer server devices that are connected to each other. Each peer server device can ensure that it is creating the same UNI and VLANs as the other peer server device in the logical server, as described in greater detail below with respect to FIGS. 14 and 15.

Boot Up of an Edge Configuration Device

In various implementations, each edge server device and each edge configuration device can broadcast its device type on the network connected to these devices. In some implementations, each edge server device and each edge configuration device also broadcasts its functional capabilities. Some implementations can designate specific "fabric attach" device types and "fabric attach" functional capabilities to distinguish such device types and capabilities from other device types and capabilities that may be sent over the network. In some implementations, each edge server device and each edge configuration device broadcasts its device type and functional capabilities in an LLDP message. For example, in some implementations, when the edge configuration device and the edge server device are powered up, and when LLDP is enabled in both the edge configuration device and the edge server device, the edge configuration device broadcasts that it is an edge configuration device (e.g., "I am an edge configuration device") within its LLDP message, and the edge configuration device transmits its edge configuration capability out all its ports. Also, the edge server device can broadcast that it is an edge server device (e.g., "I am an edge server device") within an LLDP message. Based on this LLDP message exchange, the edge configuration device knows which of its ports are uplink ports to the edge server device. In some implementations, selective device advertisements (e.g., "I am an edge server device") can be sent by an FA device, e.g., directed to particular other devices based on advertisements received from those other devices.

In some implementations, within an LLDP message, the edge server device also informs the edge configuration device the identifier (e.g., value) of a management VLAN, if a management VLAN is implemented. For example, in some implementations, the management VLAN is 1 (by default). In some implementations, if an IP address is not manually configured in the edge configuration device, and dynamic host configuration protocol (DHCP) is enabled in the edge configuration device, the edge configuration device then requests an IP address via DHCP. This IP address acquisition through DHCP can be initiated by the edge configuration device based on the fabric attach messages received in the LLDP message, and/or other fabric attach signaling with an edge server device. In some implementations, if an IP address is not manually configured in the edge configuration device, and a DHCP server is not reachable, the edge configuration device may still be configured via its console port.

Although there may be repeaters between the edge configuration device and the edge server device, LLDP messages transmitted by the edge configuration device are received by the edge server device, and LLDP messages transmitted by the edge server device and received by the edge configuration device. That is, in various implementations, the edge configuration device and the edge server device rely on LLDP messages, and not on physical link-up/link-down events, to determine the edge configuration device/edge server device connection.

In some implementations, LLDP messages include type-length-value (TLV) fields according to a fabric attach standard or protocol. In some implementations, there may be two separate TLVs in an LLDP message. One TLV, which may be referred to as a fabric attach element TLV, can indicate a device type (e.g., edge server device, edge configuration device, etc.) when a device is powered on or is otherwise enabled. In various implementations, all devices send out LLDP messages when powered on to indicate their device type. Another TLV, which may be referred to as a fabric binding TLV, includes requests for bindings in the edge configuration device, and approval indications or denial indications for such requests. For example, edge configuration devices can include requests for binding in LLDP messages sent to an edge server device. Also, edge server devices can include approval indications and/or denial indications in LLDP messages to edge configuration devices.

Message Transmission in Networks

Figure 3:
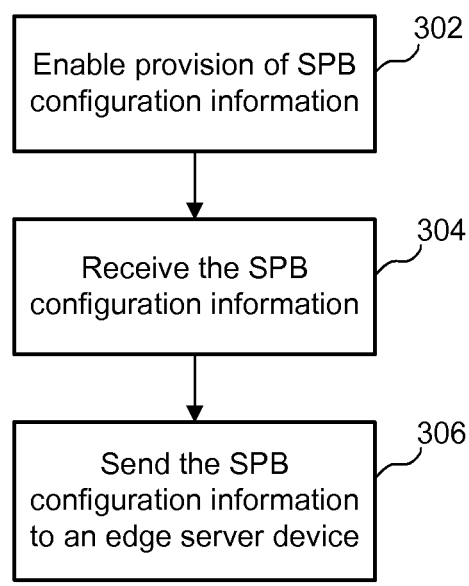
FIG. 3 illustrates an example simplified flow diagram for transmitting messages in networks, according to some implementations.

FIG. 3 illustrates an example simplified flow diagram for transmitting messages in networks, according to some implementations. Referring to both FIGS. 2 and 3, the method is initiated in block 302, where edge configuration device 204 of system 200 enables provision of shortest path bridging (SPB) configuration information. In some implementations, the user can provide SPB configuration information at an edge configuration device 204, where the user can enter SPB configuration information using a CLI. In other implementations as described below, the edge configuration device can enable reception of the SPB configuration information from other sources, such as a remote source (e.g., server) or a connected end device.

In block 304, edge configuration device 204 of system 200 receives the SPB configuration information from a source (e.g., remote source, end device, or user). In some implementations having manual input by a user, a user performs the SPB configuration at edge configuration device 204 instead of inputting the information and manually performing the configuration at edge server device 202.

In block 306, edge configuration device 204 of system 200 sends the SPB configuration information to edge server device 202. In various implementations, the SPB configuration information is sent in an LLDP message. In some implementations, the SPB configuration information is sent from edge configuration device 204 to edge server device 202 in an LLDP message. In various implementations, edge configuration device 204 and edge server device 202 exchange various types of information (e.g., VLAN-to-ISID mapping information, binding requests, approval indications, etc.) in LLDP messages.

In various implementations, the SPB configuration information includes virtual local area network-to-service identification (VLAN-to-ISID) mapping information. As described in more detail below in connection with FIG. 4, in various implementations, the SPB configuration information enables provider backbone bridge (MAC-in-MAC) encapsulation at edge server device 202. As described in more detail below in connection with FIG. 5, in various implementations, the SPB configuration information enables intermediate system-to-intermediate system (IS-IS) configuration at edge server device 202.

Enabling Configuration in Networks

Figure 4:
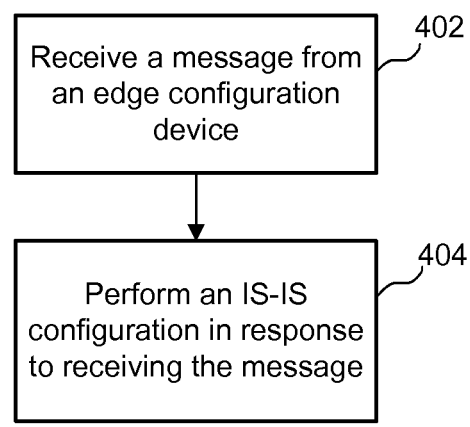
FIG. 4 illustrates an example simplified flow diagram for enabling configuration in networks, according to some implementations.

FIG. 4 illustrates an example simplified flow diagram for enabling configuration in networks, according to some implementations. Referring to both FIGS. 2 and 4, the method is initiated in block 402, edge server device 202 of system 200 receives a message from edge configuration device 204, where the message contains SPB configuration information. In various implementations, the message is an LLDP message.

In block 404, edge server device 202 of system 200 performs an intermediate system-to-intermediate system (IS-IS) configuration in response to receiving the message. In various implementations, IS-IS is a routing protocol designed to efficiently transmit information within a computer network. In various implementations, IS-IS involves the transmission of control packets, where the IS-IS broadcasts IS-IS Hello (IIH) packets to discover neighboring IS-IS routers, and to determine whether the neighbors are level 1 or level 2 routers. This is how IS-IS initializes and maintains adjacencies between neighboring routers.

In various implementations, after edge server device 202 receives the message, edge server device 202 performs the IS-IS configuration. In various implementations, the performing of the IS-IS configuration is initiated in response to receiving the message. In other words, the receipt of the message triggers the IS-IS configuration. In various implementations, the IS-IS configuration is enabled by the SPB configuration information provided by edge configuration device 204.

As described in more detail below, in various implementations, system 100 or 200 performs an SPB configuration in response to receiving the message, where the performing of the SPB configuration is enabled by the SPB configuration information provided by edge configuration device 204.

Enabling Encapsulation in Networks

Figure 5:
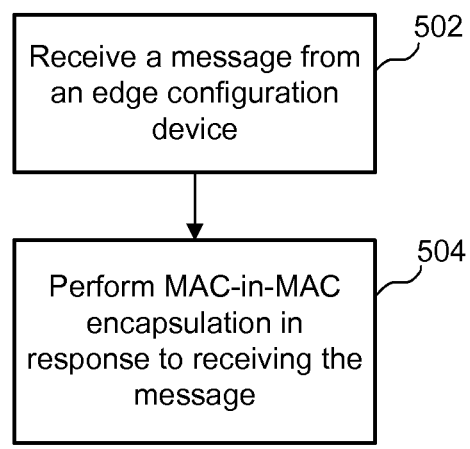
FIG. 5 illustrates an example simplified flow diagram for enabling encapsulation in networks, according to some implementations.

FIG. 5 illustrates an example simplified flow diagram for enabling encapsulation in networks, according to some implementations. Referring to both FIGS. 2 and 5, the method is initiated in block 502, where edge server device 202 of system 200 receives a message from edge configuration device 204, where the message contains SPB configuration information. In various implementations, the message is an LLDP message. As indicated above, in some implementations, the SPB configuration information is received by edge configuration device 204. In various implementations, the SPB configuration information includes VLAN-to-ISID mapping information. Example implementations directed to SPB configuration at an edge configuration device is described in more detail below.

In block 504, edge server device 202 of system 200 performs MAC-in-MAC encapsulation in response to receiving the message. In various implementations, the MAC-in-MAC encapsulation is enabled by the SPB configuration information provided by the edge configuration device. In various implementations, the performing of the MAC-in-MAC encapsulation is triggered/initiated in response to receiving the message.

In various implementations, edge configuration device 204 includes requests for bindings along with the desired VLAN-to-ISID mapping information in the LLDP message. In various implementations, edge server device 202 approves or rejects the request and VLAN-to-ISID mapping information. If edge server device 202 approves, edge server device 202 transmits an approval indication back to edge configuration device 204. Once the VLAN-to-ISID mapping information is approved, the VLAN-to-ISID mapping information is activated at edge server device 202. In some implementations, the edge configuration device uplink port configuration occurs automatically upon VLAN/ISID binding approval. In some implementations, the edge configuration device access port configuration may occur manually by a user.

In some implementations, if edge server device 202 denies/does not grant an approval of the request and VLAN-to-ISID mapping information, edge server device 202 provides a rejection indication to the edge configuration device.

SPB Configuration in an Edge Configuration Device

In various implementations, the desired VLAN-ISID mappings (also referred to as VLAN/ISID bindings) are configured in the edge configuration device. The edge configuration device sends the desired binding list to the edge server device (e.g., "Here is what I want to do"). The edge server device sends the approved binding list to the edge configuration device (e.g., "Here is what you are allowed to do"). The binding list is embedded in the LLDP messages between the edge server device and the edge configuration device. In some implementations, it may be desirable that the edge server device also sends a rejected binding list to the edge configuration device.

In various implementations, the edge configuration device and the edge server device may be connected via an uplink port in the edge configuration device, or via an uplink multi-link trunking (MLT). In some implementations, in a redundant configuration, the edge configuration device may connect via distributed multi-link trunking (DMLT) to a master/slave the edge server device/the edge server device' pair (where the edge server device/the edge server device' pair is connected via IST). In some implementations, the edge configuration device may connect via distributed multi-link trunking (SMLT) to different physical units connected by an IST that create a logical unit). In some implementations, because customer packets from the edge configuration device to the edge server device contain VLAN information, but do not contain source port information, the edge configuration device operates in CVLAN UNI mode. As such, in some implementations, only an VLAN/ISID binding needs to be configured in the edge configuration device.

Considering an example implementation where the user wants to map VLAN 5 to ISID 500. In the edge configuration device, VLAN 5 is created and the access ports that are members of VLAN 5 are specified (e.g., configuration information specifies the VLAN and ports, or a user manually creates VLAN 5 and manually specifies which access ports are members of VLAN 5). Once the 5/500 binding is approved by the edge server device, VLAN 5 is automatically enabled on the edge configuration device's uplink ports, and VLAN 5 packets egress tagged on the edge configuration device's uplink ports. In some implementations, only the edge configuration device's uplink port configuration occurs automatically when a VLAN/ISID binding is approved by the edge server device. In the edge configuration device, VLAN creation and access port VLAN membership can be entered manually in some implementations, or these can be determined automatically based on configuration information obtained from another source. When the edge server device receives a packet from the edge configuration device with VLAN 5, the edge server device can MAC-in-MAC-encapsulate the packet with ISID 500, for example.

SPB Configuration in an Edge Server Device

In some implementations, SPB configuration may occur directed at the edge server device, where the edge server device maps a VLAN identifier (ID) to an ISID. In switched UNI mode, the VLAN/ISID mapping is per port in the edge server device. For example, VID 5 may map to ISID 500 on port 1, while VID 5 may map to ISID 501 on port 2. In customer VLAN-user network interface (CVLAN UNI) mode, the VLAN/ISID mapping is per the edge server device. For example, VID 6 may map to ISID 600 on all ports in the edge server device. The edge server device may operate in CVLAN UNI mode and switched UNI mode simultaneously.

There can be much SPB configuration that occurs at the edge server device. In some implementations, VLAN/ISID bindings may be configured at the edge server device, whether in CVLAN UNI mode or in switched UNI mode. However, it may be preferred not to configure SPB on at the edge server device due to its complexities, and to configure SPB at the edge configuration device due to its simplicity.

In some implementations, only switched UNI bindings are input and/or configured in the edge server device. In some implementations, CVLAN UNI can be entered directly in the edge server device.

In an example implementation, a VLAN/ISID binding is implemented to map VLAN 5 to ISID 500. In some examples, the edge configuration device receives this binding information as configuration information from either an access control server or an end device. The edge configuration device maintains a list of locally generated VLAN/ISID bindings. In some implementations, if VLAN 5 already maps to a different ISID (such as ISID 600), the edge configuration device can immediately output an error message to a server or a user management device, since a VLAN can map to only one ISID in the edge configuration device in some implementations. If binding VLAN 5 to ISID 500 is acceptable from the edge configuration device's perspective, the edge configuration device adds the 5/500 binding to its desired binding list in the LLDP packet it transmits to the edge server device.

In switched UNI mode, the VLAN/ISID binding is per port in the edge server device, so the edge server device will not deny any valid VLAN/ISID binding request from the edge configuration device (e.g., a valid binding request being one that the edge server device is able to fulfill, e.g., not a request that specifies a VLAN that already exists but is not the correct type). Thus, the edge server device accepts the 5/500 binding on its port that connects to the edge configuration device. The edge server device adds the 5/500 binding to its approved binding list in the LLDP packet it transmits to the edge configuration device. The edge configuration device will determine when the 5/500 binding has been approved by the edge server device by checking for the 5/500 binding in the approved binding list in the edge server device's LLDP message to the edge configuration device. As indicated above, the VLAN/ISID binding is not activated in the edge configuration device until the edge server device approves the VLAN/ISID binding.

FIG. 6 through FIG. 10 describe an example scenario in which VLAN/ISID bindings are configured on an edge server device and an edge configuration device 204. The VLAN/ISID binding is provided from a single edge configuration device (switched UNI mode). In various implementations, the label "ESD" in the figures represents VLAN/ISID bindings at an edge server device, and the label "ECD" in the figures represents VLAN/ISID bindings at an edge configuration device.

FIG. 6 illustrates example binding lists, according to some implementations. As shown, in this particular scenario, both the edge server device and the edge configuration device initially have empty binding lists.

FIG. 7 illustrates example binding lists, according to some implementations. As shown, VLAN 6 is created in the edge configuration device, e.g., after a VLAN/ISID binding is accepted by the edge server device, and based on configuration information received at the edge configuration device from a server, end device, or user (e.g., via a CLI), etc. One or more access ports are placed in VLAN 6 based on the configuration information. A 6/600 binding is instructed via the configuration information. The edge configuration device places 6/600 in its local pending binding list.

FIG. 8 illustrates example binding lists, according to some implementations. As shown, the edge configuration device places 6/600 in its desired binding list in its LLDP message to the edge server device. The edge server device then receives the LLDP message from the edge configuration device, with the desired 6/600 binding. The edge server device then places 6/600 in its remote pending binding list. Since 6/600 is a desired binding in switched UNI mode, the edge server device approves the 6/600 binding on its UNI port that connects to the edge configuration device. The following configuration updates occur automatically in the edge server device: VLAN 6 is created (if VLAN 6 does not already exist in the edge server device); the UNI port that connects to the edge configuration device is placed in VLAN 6; and VLAN 6 is mapped to ISID 600 on the UNI port that connects to the edge configuration device.

FIG. 9 illustrates example binding lists, according to some implementations. As shown, the edge server device moves the 6/600 binding from its remote pending binding list to its remote approved binding list, and adds the 6/600 binding, or "6/600," in its approved binding list in its LLDP message to the edge configuration device.

FIG. 10 illustrates example binding lists, according to some implementations. As shown, the edge configuration device receives the LLDP message from the edge server device, and notices that 6/600 is in the approved binding list. The edge configuration device moves the 6/600 binding from its local pending binding list to its local approved binding list.

In various implementations, once 6/600 has moved to the edge configuration device's local approved binding list, the edge configuration device enables the 6/600 binding by automatically enabling VLAN 6 on its uplink ports and enabling tagged packet transmission on the uplink ports for VLAN 6. Based on acceptance of the bindings by the edge server device, the edge configuration device can also create the VLAN in its memory and associate access ports with the VLAN.

At this point, the edge server device begins to receive VLAN-6-tagged packets from the edge configuration device. The edge server device can perform MAC-in-MAC encapsulation, and maps VLAN 6 to ISID 600, but only on the UNI port that connects to the edge configuration device.

In various implementations, it is preferable that the edge server device maintains its VLAN/ISID bindings per edge configuration device. That is, a first edge configuration device does not know about the VLAN/ISID bindings input to a second edge configuration device, and the second edge configuration device does not know about the VLAN/ISID bindings input to the first edge configuration device N1. In some implementations, if the edge server device is able to generate only one global version of its LLDP message, then the edge configuration device identifying information would need to be added to the edge server device's approved VLAN/ISID binding list. If the edge server device can generate an individual LLDP message per port, the edge server device can send VLAN/ISID bindings specific to that port.

Storage of SPB Information in Configuration Files

In some implementations, if the VLAN/ISID bindings are added in the edge server device, the VLAN/ISID bindings may be considered local bindings, because these VLAN/ISID bindings were explicitly entered in the edge server device. In some implementations, these local VLAN/ISID bindings may be stored in the edge server device's configuration (config) file.

In some implementations, VLAN/ISID bindings are added in the edge configuration device. As such, the edge server device maintains a list of local bindings (entered in the edge server device) and a list of remote bindings (received from the edge configuration device). The local bindings are stored in the edge server device's configuration (config) file. In some implementations, the remote bindings are lost during an edge server device reset, and the remote bindings are re-established when the edge server device and the edge configuration device begin to communicate after a device reset.

From the edge configuration device's perspective, any VLAN/ISID bindings received as configuration information in the edge configuration device (e.g., from other sources than the edge server device) would be local bindings; these local bindings are stored in the edge configuration device's configuration file. For example, the edge configuration device can store an approved local binding list (e.g., bindings accepted by the edge server device) and a pending local binding list (i.e., bindings received at the edge configuration device, but not yet accepted by the edge server device).

Device Resets

The following describes what happens when an edge server device or an edge configuration device resets (or network connectivity to these devices is lost, perhaps due to an unplugged cable).

As described herein, the edge server device's local bindings are retained in the edge server device's configuration. If an edge server device resets, any remote bindings received from the edge configuration device (or an end device) are lost. As binding requests are received from the edge configuration device's (or end devices), the edge server device validates the binding requests, and adds the approved bindings to the approved binding list in its outgoing LLDP messages. The edge configuration device detects that the approved binding list from the edge server device has either disappeared (while the edge server device is resetting) or is shorter (due to the edge server device purging its remote bindings). The edge configuration device contracts its approved local binding list, and moves those bindings into its pending local binding list. In some implementations, these pending local bindings move to the approved local binding list only after the edge server device has approved the bindings. When a binding moves from the approved local binding list to the pending local binding list, the edge configuration device can remove the uplink ports from those VLANs, as well as possibly deleting the VLAN and clearing the VLAN memberships on access ports.

As described herein, the edge configuration device's local bindings are retained in the edge configuration device's configuration. If an edge configuration device resets, any remote bindings received from end devices are lost. In some implementations, the edge configuration device's local bindings are not restored following a reset, and VLAN settings related to these bindings may be cleaned up following a reset and binding deletion. In other implementations, the edge configuration device's local bindings can be placed in its pending local binding list, and the edge configuration device can populate its LLDP message with the pending local bindings. The bindings move to the edge configuration device's approved local binding list after the edge server device has approved the bindings (by the edge server device adding the bindings to its LLDP message back to the edge configuration device).

With regard to fabric attach settings, in some implementations, any artifacts that occur dynamically (in the edge configuration device or the edge server device) upon a VLAN/ISID binding approval, are automatically removed when the VLAN/ISID binding request is deleted. The goal is to not leave any fabric attach settings in the edge configuration device or the edge server device.

In some implementations, an edge configuration device supports only C-VLAN UNIs (since these are non-SPBM devices) whereas a edge server devices can support both switched UNIs (e.g., can be created through fabric attach signaling) and C-VLAN UNIs. Bindings may be received by the edge configuration device or the edge server device via end device, remote source, or user (e.g., CLI).

Dynamic Actions in the Edge Configuration Device (when a C-VLAN UNI Binding is Entered in the Edge Configuration Device)

In some implementations, when a VLAN/ISID binding request is received by the edge configuration device from a different server, end device, or user, and the binding request is approved by the edge server device, the following actions can occur dynamically in the edge configuration device. The VLAN can be created at the end configuration device, the VLAN is enabled on the edge configuration device's uplink ports, access port updates (VLAN membership, tagging status) can be made, and packets in that VLAN are transmitted tagged on the edge configuration device's uplink ports.

In some implementations, when the VLAN/ISID binding is deleted in the edge configuration device, the VLAN uplink membership may be deleted (unless it was manually configured prior to acceptance of the binding). If the VLAN is no longer associated with the uplink, no traffic for the VLAN will be transmitted on the uplink. The VLAN itself can also be deleted and all VLAN memberships that were dynamically updated based on FA processing may also be removed. In other implementations, when the binding is deleted, the software in the edge configuration device can disable the VLAN on the configuration device's uplink ports, and transmit packets in that VLAN untagged on the edge configuration device's uplink ports.

Dynamic Actions in the Edge Server Device (when a C-VLAN UNI Binding is Entered in the Edge Configuration Device)

In some implementations, when an VLAN/ISID binding request is received by the edge configuration device from a different server, end device, or user, and the binding request is approved by the edge server device, the following actions can occur dynamically in the edge server device. The VLAN is created (if the VLAN does not already exist in the edge server device); the UNI port that connects to the edge configuration device is placed in the VLAN; and the VLAN is mapped to the ISID on the UNI port that connects to the edge configuration device (e.g., a switched UNI is created for the UNI port).

In some implementations, when the VLAN/ISID binding request is deleted in the edge configuration device, and this deletion is detected in the edge server device, the software in the edge server device can delete VLANs that were previously dynamically created, remove the UNI port that connects to the edge configuration device from the VLAN, and delete the VLAN/ISID binding on the UNI port that connects to the edge configuration device.

The VLAN created in the edge server device can be a fabric attach artifact when a VLAN/ISID binding request from the edge configuration device is deleted. Dynamically created VLANs can be deleted on edge server devices if they are not in use once the binding in question is deleted. The VLAN thus will not remain an artifact.

In some implementations, a user can perform SPB configuration directly in the edge server device. Thus, the user might manually create a VLAN in the edge server device, and manually add the desired ports to the VLAN, when entering the VLAN/ISID binding in the edge server device.

Figure 11:
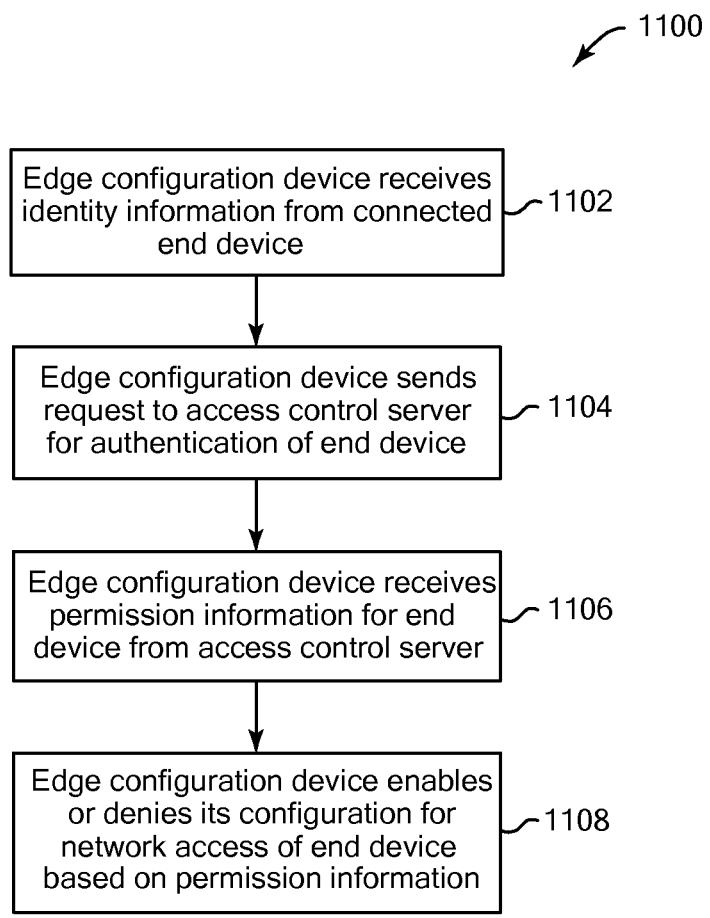
FIG. 11 illustrates an example simplified flow diagram for authenticating a device for use on a network, according to some implementations.

FIG. 11 is a flow diagram illustrating an example method 1100 for authenticating a device for use on a network, e.g., an end device (client device). Method 1100 can be implemented, for example, by an edge configuration device connected to a network as described above. Prior to the method, an edge configuration device and an edge server device can establish communication and can be set up and connected to the network, e.g., an SPB network as described above with respect to FIG. 2. An end device can be connected to the edge configuration device, e.g., similarly as described above for FIG. 2. The end device can be a non-SPB network device that is not compatible with SPB protocols and cannot utilize the SPB network functionality. In this example, the end device can be either a fabric attach device that, for example, runs a fabric attach agent and can communicate SPB configuration information as described above, or can be a non-fabric attach device that does not understand or know the fabric attach formatted SPB configuration information.

In block 1102, the edge configuration device receives information from an end device that has been connected to the network. In some examples, the end device may have been connected to a port of the edge configuration device and/or powered on. In some implementations, the end device can be compatible with a fabric attach feature causing the end device to broadcast the information, including identity information, in TLVs on the network, e.g., as described above. In some implementations, the end device is not compatible with the fabric attach feature. Some implementations of non-fabric attach end devices may have the end device automatically send identity information to a connected device on the network. The identity information can be sent out automatically by the end device upon its connection to the edge configuration device, upon its power-up, or upon some other condition of the end device.

The identity information identifies the end device and/or one or more accounts/users associated with the end device. In one example, the identity information can include an identifier (e.g., user name or account name) and/or password. In some other examples, the identity information received from the end device can include other types of information. For example, the identity information can include a MAC (Media Access Control) address for the end device. In some implementations, the identity information can include an identification of a type of the end device. For example, types can include a wireless access point, a cell phone, a tablet computer, a laptop computer, a printer, a desktop computer, or other type of device, e.g., based on a predetermined mapping of identifiers to device types. In some implementations, the information received from the end device includes the identity information and a specific request for the end device to be authenticated for access to the network (e.g., a network such as the SPB cloud of FIG. 2). in other implementations, the edge configuration device can treat the identity information as such a request for access for the end device. In some implementations, the identity information can include other information not related to the identity of the end device or associated user.

In block 1104, the edge configuration device sends a request to an access control server for authentication of the end device, e.g., the access control server 212 of FIG. 2. In some implementations, the access control server can be connected to the SPB cloud 211, so that the edge configuration device can communicate with the access control server through a connected edge server device and though the SPB cloud 211. For example, the edge configuration device can be provided with the address of the access control server in its memory or other storage.

As described above with reference to FIG. 2, the access control server includes or is connected to an authentication module 214. The authentication module can be implemented using any suitable standards and implementations, e.g., as a RADIUS server. The access control server receives the identity information from the edge configuration device and provides the identity information (or a processed form of the identity information) to the authentication module. In some implementations, the authentication module can compare the identity information from the end device to data describing authenticated devices or types of devices. Such data can be stored by the access control server or is otherwise accessible to the authentication module. The authentication module determines and verifies whether the end device is authentic, e.g., a valid device allowed to connect to the SPB network of SPB cloud 211. For example, if the identity information includes a account name (e.g., user name) and password, the authentication module can determine whether the user name and password are valid as matched in its stored data. If the identity information includes a MAC address, the authentication module can check whether the MAC address is valid and whether it is allowed or prohibited from access the network, e.g., by matching it to stored data of validated MAC addresses. If the identity information includes a type of device, the authentication module can determine whether that type of device is allowed to connect to the network by checking a stored list of allowed types of devices. For example, in some implementations, an authentication framework or standard such as Extensible Authentication Protocol (EAP), Negotiated EAP (NEAP), and/or IEEE 802.1X can be used for the authentication module and communication with the authentication module.

In block 1106, the edge configuration device receives permission information for the end device from the access control server. Based on the result of the authentication process, the authentication module outputs this permission information indicating whether the end device is allowed or denied access to the SPB network. The authentication module sends this permission information to the edge configuration device, e.g., via the SPB cloud and edge server device connected to the edge configuration device.

In block 1108, the edge configuration device enables or denies its configuration to allow network access for the end device based on the permission information. For example, if the permission information indicates that the end device is valid and is allowed to access the network, the end device has been authenticated and the edge configuration device can begin the configuration process. Some examples of a configuration process using configuration information obtained from a remote source are described below. Alternatively, the edge configuration device can configure access for the end device using configuration information obtained from another source, e.g., manual entry from a user in a CLI, etc.

In some implementations, the edge configuration device provides a request for configuration information with or in addition to the request for authentication sent in block 1104, and the access control server can send configuration information with the permission information to the edge configuration device. Such configuration information is described in greater detail below with respect to FIG. 12.

Figure 12:
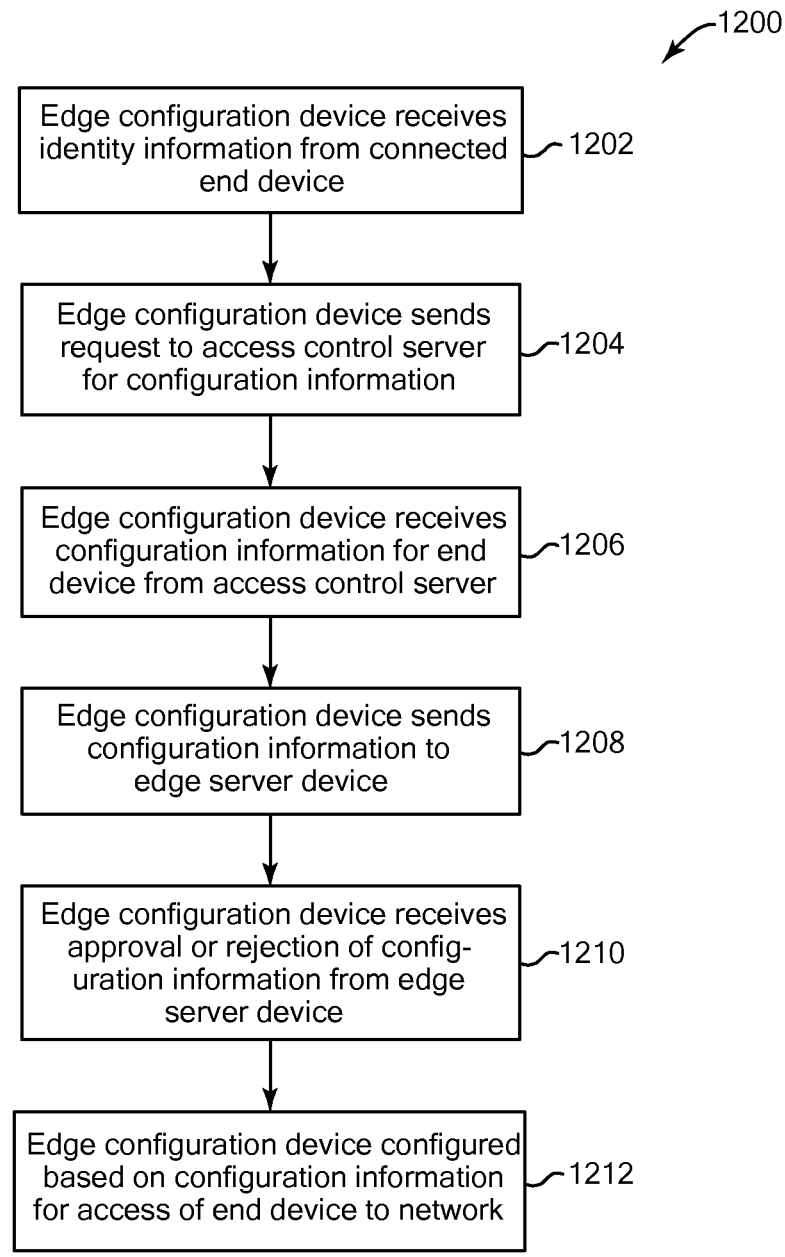
FIG. 12 illustrates an example simplified flow diagram for configuring a network for a client device based on configuration information obtained by an edge configuration device, according to some implementations.

FIG. 12 is a flow diagram illustrating an example method 1200 for configuring a network for a client device based on configuration information obtained by an edge configuration device. Method 1200 can be implemented, for example, by an edge configuration device connected to a network as described above. Prior to the method, an edge configuration device and an edge server device can establish communication and can be set up and configured on the network, e.g., an SPB network as described above. An end device (e.g., client device) can be connected to the edge configuration device, e.g., similarly as described above for FIG. 2. The end device can be a non-SPB device that is not compatible with SPB protocols and cannot utilize SPB network functionality.

In this example, the end device can be either a fabric attach device that, for example, runs a fabric attach agent and can communicate SPB configuration information as described above, or can be a non-fabric attach device that does not understand or know the fabric attach formatted configuration information.

In block 1202, the edge configuration device receives identity information from an end device. In some implementations, this block can be similar to block 1102 of FIG. 11, e.g., the identity information can be an account name and password, MAC address, indicator of type of the end device, and/or other information, which is sent out automatically by the end device upon its connection to the edge configuration device, upon its power-up, or upon some other condition of the end device.

In block 1204, the edge configuration device sends a request for configuration information to a remote source, such as a remote server. The remote server is remote since it is connected to the edge configuration device through a network. In the example of FIG. 2, the remote server is not the connected edge server device, but is another server. For example, the edge configuration device sends a request to an access control server to request configuration information with respect to the end device. For example, the request can be sent to access control server 212 of FIG. 2. In some implementations, the access control server can be connected to the SPB cloud 211, so that the edge configuration device can communicate with the access control server through the connected edge server device and though the SPB cloud 211. For example, the edge configuration device can be provided with the address of the access control server in its memory or other storage. In some implementations, for example, the access control server can be a server that is not an edge server device using the fabric attach messages described herein. In some implementations, for example, the access control server can provide policy enforcement for the network.

In some implementations, the request can include the identity information received in block 1202, or can be a general request for configuration information for an end device. For example, in some implementations, the request can accompany a request for authentication of the end device as described above with reference to FIG. 11, e.g., where the access control server includes or is in communication with an authentication module. In some implementations, the edge configuration device can insert additional information in the request based on the identity information. For example, if the identity information indicates a particular type of end device, then the edge configuration device can add particular information related to requesting configuration information for such a device. In some implementations, the edge configuration device can provide a particular type of request (e.g., including particular or different information) based on a particular account name, type of end device, MAC address, or other identity information. For example, one request for a first end device can include different information than a second request for a second end device, based on particular account names, types of end device, or MAC addresses identifying the end devices.

The access control server receives the request for configuration information from the edge configuration device and processes the request. For example, in some implementations this processing can include determining one or more VLAN/ISID bindings for the network and for the end device, based on the current network state as known by the access control server. For example, a predetermined set of bindings can be associated with particular end devices, user accounts, MAC addresses, and/or types of devices. The access control server can consult stored tables and other information to determine VLAN/ISID bindings.

In block 1206, the edge configuration device receives the configuration information from the access control server, where the access control server has sent the configuration information over the SPB cloud 211 and through the edge server device connected to the edge configuration device. In block 1208, the edge configuration device sends the configuration information to the edge server device that is connected to the edge configuration device. For example, the edge configuration device can provide LLDP packets to the edge server device including this configuration information, as described above. The edge server device determines whether the configuration information is valid, e.g., whether each VLAN/ISID assignment in the configuration information is acceptable to the server based on resource limitations and/or any restrictions related to the edge configuration device. If valid, a fabric attach agent on the edge server can perform one or more actions, e.g., create the VLANs and define switched UNIs in its memory, enable port tagging (on the port connecting the edge server device and edge configuration device), etc., if needed (such actions may not be needed if a specified VLAN/ISID assignment is already associated with the ingress interface (edge configuration device downlink)). If not valid, the edge server can decline to create any new VLAN/ISID bindings based on the configuration information.

In block 1210, the edge configuration device receives information from the edge server device indicating approval (acceptance) or rejection of the configuration information by the edge server device. For example, if the edge server device approves the configuration information, then the configuration information is valid and suitable for configuring the network. If the edge server device rejects the configuration information, then the configuration information was found to be invalid and unsuitable for configuring the network. In some implementations, the information can be sent via LLDP packets. Some implementations can receive a "rejected" state from the edge server as well as an indication as to why the rejection occurred.

In block 1212, the edge configuration device configures itself to provide access of the end device to the network based on the configuration information if the configuration information was approved by the edge server device. For example, the edge configuration device can create port-based VLANs in its memory (if the VLANs do not already exist), assign port(s) of the edge configuration device to the created VLAN(s), assign a tagged port status to assigned ports, etc., based on the configuration information. Thus, in some implementations, the edge configuration device can provision one or more network services (or virtual services) for the end device. Each VLAN associated with VLAN/ISID binding in the configuration information can be defined on the edge configuration device, where the port associated with the uplink connecting the edge configuration device with the edge server is member of the VLAN(s) in the VLAN/ISID assignment list (bindings) that is sent to and accepted by the edge server, thus allowing traffic on those VLANs to pass through the edge configuration device into the SPB fabric when required. Traffic on the uplink port is tagged to ensure that VLAN markings are maintained on packets between edge configuration devices, switches, and other devices in the network. In some implementations, the edge configuration device can send configuration information to the end device so that the end device can configure the binding information and VLANs in its own memory. If the edge server rejected the configuration information, then the edge configuration device can perform any required clean-up tasks for its own memory and setup and log the rejection in block 1212.

Figure 13:
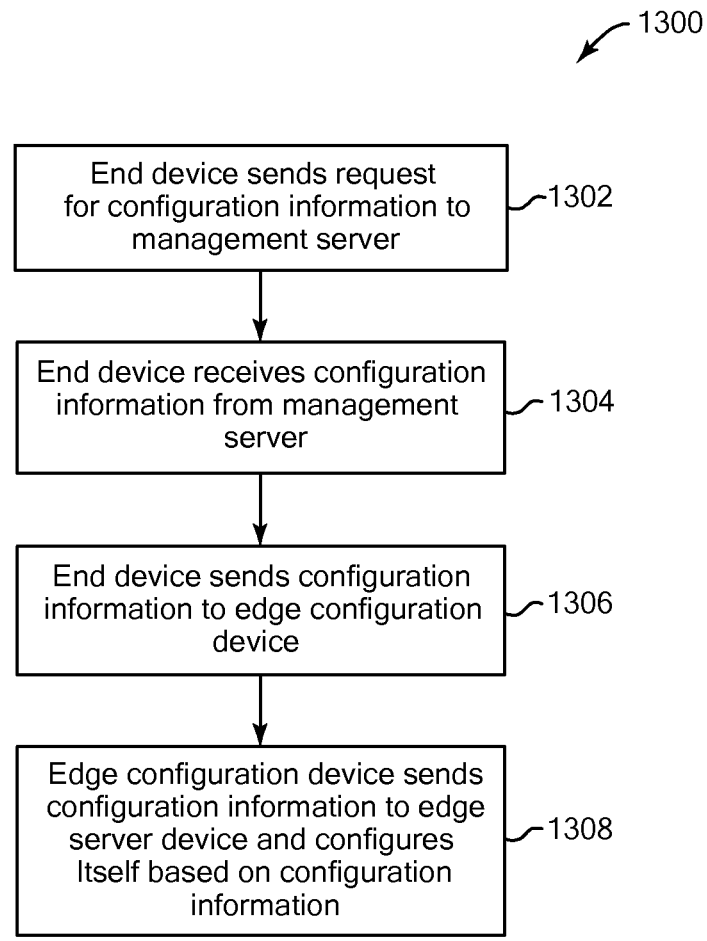
FIG. 13 illustrates an example simplified flow diagram for configuring a network for a client device based on configuration information obtained by an end device, according to some implementations.

FIG. 13 a flow diagram illustrating an example method 1300 for configuring a network for an client device based on configuration information obtained by a client device. Method 1300 can be implemented, for example, by an end device (e.g., client device) that has been connected to a network as described above. Prior to the method, an edge configuration device and an edge server device can establish communication and can be set up and configured for a network, e.g., an SPB network as described above. An end device can be connected to the edge configuration device, e.g., similarly as described above for FIG. 2. The end device can be a non-SPB device that is not compatible with SPB protocols and cannot utilize SPB network functionality. The end device can also be a fabric attach network device (e.g., running a fabric attach agent) that is able to communicate SPB configuration information to other fabric attach devices in a fabric attach format.

In block 1302, the end device sends a request for configuration information to a remote source, e.g. a remote server. The remote server is remote since it is connected to the end device through a network. In the example of FIG. 2, the remote server is not the connected edge server device, but is another server. For example, the end device sends a request for configuration information to a management server, e.g., management server 216 shown in FIG. 2. For example, the request can be for SPB configuration information that can be used to configure one or more network devices to allow the end device to communicate with the SPB network. In some implementations, the request can include identity information describing the end device and/or one or more accounts/users associated with the end device, similarly as described above for FIGS. 11 and 12. In some implementations, the request for configuration information can be sent by the end device in response to the end device being connected to the edge configuration device, e.g., the end device senses the edge configuration device by receiving fabric attach information from the edge configuration device (which can be in response to the end device sending out information on the connection).

In some implementations, the end device can have an independent connection to the management server that is not part of an SPB network, such as a wireless connection, a wired connection, a connection on a different non-SPB network, etc. This allows the end device to connect to the management server before being established and able to communicate on the SPB network. The management server can be implemented in any suitable manner. In some implementations, for example, the management server can be a server that is not an edge server device using the fabric attach messages described herein. In some implementations the management server can provide monitoring, operation, and/or management abilities for one or more networks, e.g., a WLAN Orchestration System (WOS) server available from Avaya Inc. of Santa Clara, Calif.

The management server can be previously provided with and store configuration information for the SPB network. For example, a user (e.g., network administrator) can input desired configuration information for devices on the network to the memory or other storage of the management server. This configuration information can include VLAN/ISID bindings, for example. In some implementations, particular configuration information can be associated with particular end device identity information such as users/accounts, MAC addresses, types of end devices, and/or other end device identity information, if such information is received in the request. For example, the management server can store such associations between configuration information and identity information in one or more storage devices, and stored in tables, records, or other organizational format.

Upon receiving the request from the end device for configuration information, the management server can determine whether any configuration information is available for that particular end device, or that type of end device, in its accessible storage. In some implementations, the request for configuration information by the end device can be included in or accompanied by one or more requests by the end device for other information stored and provided by the management server, such as registration and/or other information for wireless access point operation, and/or other configuration data that the end device can use to configure itself. For example, the end device can be a wireless access point and can register with the management server (e.g., find the server, provide its identity and characteristics to the server and exchange messages to allow the wireless access point to service wireless client devices), and can request information for wireless access point operation.

In some implementations, the management server can be involved in authentication of the end device (and/or of a user associated with the end device) for access to the SPB network. For example, for example, the end device can send a request to the management server, which can forward the request to a separate authentication server, or an authentication portion of the management server can perform such authentication. The management server can send an indication back to the end device indicating whether the end device is authenticated or not, similarly as described above for the edge configuration device and access control server with respect to FIG. 11.

In block 1304, the end device receives configuration information from the management server (e.g., assuming that such configuration information exists and is available to the management server to be sent to the end device). As described above, the configuration information can include VLAN/ISID bindings for the network to allow use of VLAN(s) in the SPB cloud for the end device.

In block 1306, the end device sends the configuration information to the edge configuration device. For example, in some implementations the end device can be fabric attach enabled, allowing the end device to send a predefined packet format with configuration information to the edge configuration device. For example, such a fabric attached enabled end device can send the configuration information in one or more LLDP packets, in a format which can be read by the edge configuration device that is also fabric attach enabled, similarly as described above.

In block 1308, the edge configuration device that receives the configuration information from the end device sends the configuration information to an edge server device for network configuration and configures itself based on the configuration information (if appropriate). For example, similarly as described above, if the edge server device accepts the configuration information as valid and sends the acceptance back to the edge configuration device, the edge configuration device can create the designated one or more VLANs in its memory based on VLAN/ISID bindings in the configuration information, create one or more port memberships of the one or more VLANs for the end device on the edge configuration device, and set up port tagging on one or more ports and connection between edge configuration device and edge server device, similarly as described above for FIG. 12. Thus, in some implementations, the edge configuration device can provision one or more network services (or virtual services) for the end device. In some implementations, the edge configuration device can send an edge server acceptance and/or send the configuration information to the end device for the end device to create the VLANs in its own memory. If the edge server device sends back a rejection of the configuration information sent by the edge configuration device, then the edge configuration device can clear any settings or configuration from its memory and ignore the configuration information received from the end device, and can notify the end device of the rejection in some implementations.

Figure 14:
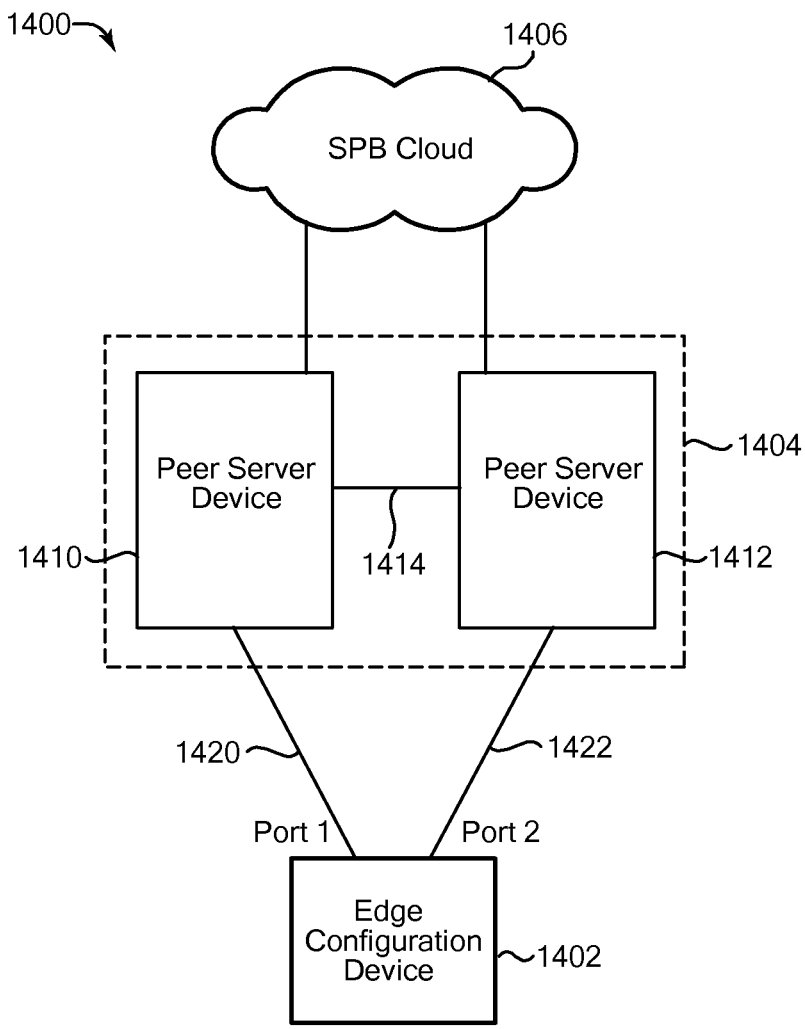
FIG. 14 is a block diagram illustrating an example network system including a server cluster device with peer server devices, according to some implementations.

FIG. 14 is a block diagram illustrating an example network system 1400 including a server cluster device with split peer server devices and suitable for use with one or more implementations described herein. Network system 1400 includes an edge configuration device 1402 that is coupled to an edge server device 1404. The edge server device 1404 is coupled to an SPB network or "cloud" (or other type of network) 1406, similarly as edge server device 202 described above in FIG. 2. Other components can also be connected which are not shown, e.g., one or more end devices coupled to the edge configuration device 1402 and/or to the edge server device 1404 similarly as shown in FIG. 2.

The edge server device 1404 includes a plurality (e.g., two) peer server devices 1410 and 1412. Each peer server device 1410 and 1412 can be an edge server device similar to edge server device 202 shown in FIG. 2, or can include a subset of the functionality of the edge server device 202. In this example, each peer server device 1410 and 1412 is connected to the SPB cloud 1406.

The peer server devices 1410 and 1412 are directly connected to each other by a communication link 1414. The communication link 1414 can include one or more parallel point-to-point links, and allows the peer server devices 1410 and 1412 to send signals and information to each other. In some implementations, the communication link 1414 is an InterSwitch Trunk (IST) which is used to allow the two servers to communicate and share addressing information, forwarding tables, and state information (e.g., link state information) with each other, as well as other information described below. For example, the server 1404 can make use of an IST protocol such that the peer servers 1410 and 1412 are aggregate servers that create a single logical server 1404 with respect to devices connecting to the server 1404 via network links (edge server device 1404 can also be considered a server cluster). For example, this configuration can allow devices configured to use an appropriate link aggregation protocol (e.g., IEEE 802.3ad static link aggregation protocol) to connect to both servers and take advantage of load balancing across both peer servers and take advantage of multiple redundant connections to the servers. In some implementations, the peer servers 1410 and 1412 can make use of Split Multi-Link Trunking (SMLT) aggregation technology to perform load balancing between received traffic on incoming network links.

In the example of FIG. 14, the edge server device 1404 is connected to the edge configuration device 1402 so as to appear to the edge configuration device as a single logical server. For example, the edge configuration device 1402 is connected to each peer server device in server device 1404 by a different port of the edge configuration device 1402. In this example, port 1 of the edge configuration device is coupled to peer server device 1410 by a network link 1420, and port 2 of the edge configuration device is coupled to peer server device 1412 by a network link 1422. Each link 1420 or 1422 can be a single link, or can be implemented as multiple links, e.g., in a multi-link trunking (MLT) implementation. In some implementations, the edge configuration device 1402 can generate and send the same packets (including the same LLDP frames) on all links connected to the edge server device 1404, and receives packets from the server 1404 on either of the ports/links as determined by the peer servers 1410 and 1412. For example, in a dual-homed configuration, if the edge configuration device is connected to both peer server devices then both peer server devices receive the same data. If the edge configuration device is connected to only one of the peer server devices (a single-homed connection), the data received by the peer server device connected to the edge configuration devices is passed to the peer server device that is isolated (not connected to the edge configuration device) for validation and installation. Examples of such operation are described in greater detail below.

The edge server device 1404 can be used with the fabric attach features described herein. For example, a fabric attach agent can run on each peer server 1410 and 1412 and the server device 1404 can receive, process and send fabric attach information (e.g., configuration information) to allow end devices to communicate with the SPB cloud 1406. Examples of such operation are described below with reference to FIG. 15.

Figure 15:
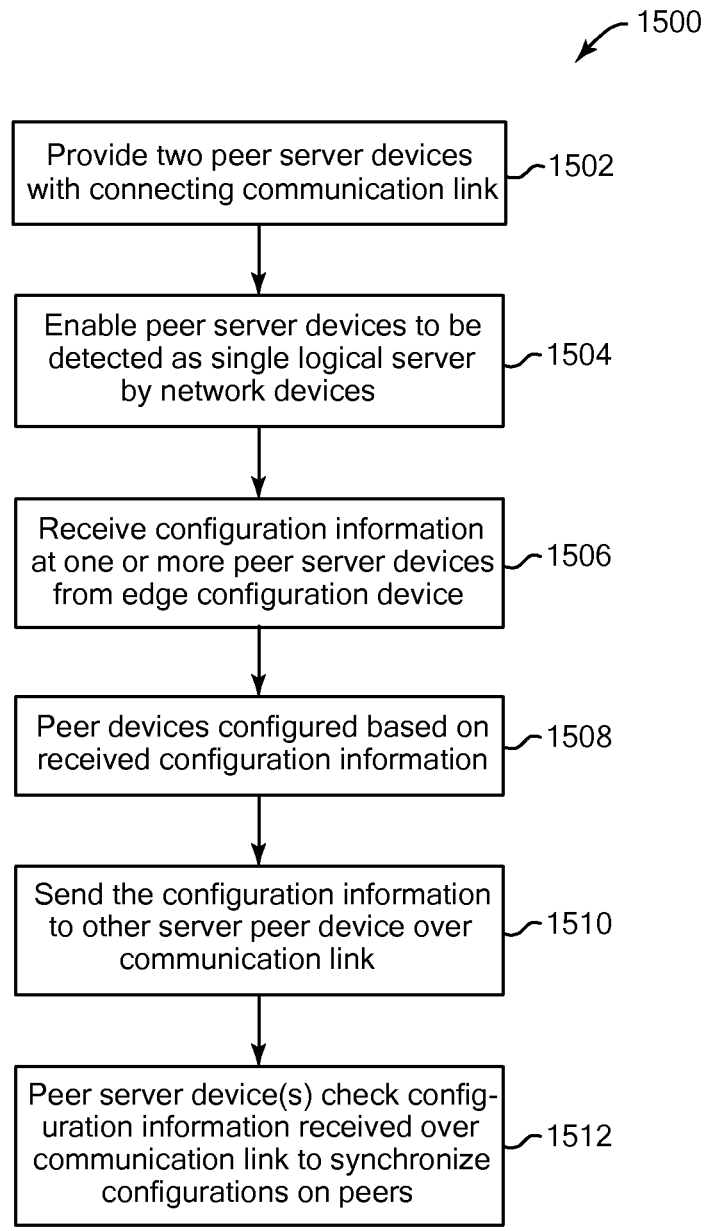
FIG. 15 illustrates an example simplified flow diagram for configuring a network using peer server devices.

FIG. 15 is a flow diagram illustrating an example method 1500 for configuring a network having a server cluster. Method 1500 can be implemented, for example, by network devices such as each of multiple peer server devices included in an edge server device (server cluster) that has been connected to a network as described above with reference to FIGS. 14 and 2. Prior to the method, an edge configuration device and the edge server device can establish communication and be set up and configured on the network, e.g., an SPB network as described above. In some implementations, each peer server device is provided with a fabric attach agent or other control software enabling communication of the fabric attach information described herein.

In block 1502, the method provides two peer server devices in a server cluster, with a communication link connecting the peer server devices, to form a single logical server device. As described above for FIG. 14, the communication link can be a type of link that allows the peer server devices to communicate information with each other. For example, the link can be an Inter-Switch Trunk (IST) type of link used in SMLT. The peer server devices can communicate information such as information related to traffic forwarding and status of individual links, as well as configuration information as described below.

In block 1504, the method enables the peer server devices to be detected as a single logical server (e.g., a server cluster) on a network by network devices connected to that network. For example, in some configurations, each peer server device can be connected to a different port of a single edge configuration device or of a different type of network device. A single edge configuration device sees the multiple connections to the logical server device as a single trunk or link. In other configurations, one peer server device is connected to a port of one edge configuration device, and the other peer server device is connected to a port of a different edge configuration device (or other network device).

In block 1506, one or more of the peer server devices receives fabric attach configuration information over the network from an edge configuration device. The configuration information can include information such as VLAN/ISID bindings as described above, and can be provided in a known fabric attach protocol and format, such as LLDP packets that include one or more TLVs as described above. The edge configuration device sends this configuration information to the logical server to allow creation and/or approval of VLANs, e.g., for use by an associated end device or other network device (or multiple such devices) connected to the edge configuration device as described above.

In some cases, both peer server devices are connected to the edge configuration device at ports of the edge configuration device and are both receiving the same information from the edge configuration device. For example, the edge configuration device can send the same configuration information on both ports using the example system shown in FIG. 14. In other cases, only a first one of the peer server devices receives the configuration information while the other peer server device in the logical server does not receive the configuration information. For example, the first peer server device is connected to the edge configuration device and the other peer server device is not connected to that edge configuration device, e.g., is connected to a different edge configuration device or other network device, or is not connected to a network device.

In block 1508, the peer devices are configured based on their received configuration information. For example, a peer device that received VLAN/ISID bindings from the edge configuration device can define a switched UNI, create VLAN/ISID bindings in its memory, and enable port tagging on the port connected to the edge configuration device, similarly as described above for edge server devices, if such bindings and configuration are acceptable to the peer server device. If the received configuration information (e.g., bindings) are not acceptable to the peer server, no configuration is made of the peer server device and a rejection is sent back to the edge configuration device from that peer server, similarly as described above.

In block 1510, the peer server device(s) that received the configuration information in block 1506 sends the configuration information to the other peer server device over the communication link connecting the two peer server devices (such as an IST). In some implementations, the configuration information itself is sent over the communication link, while in other implementations, information related to (e.g., describing or derived from) the configuration information is sent over the communication link, e.g., a subset of the configuration information if not all of it is needed for the other peer server device to configure itself or compare the information as described below.

For example, in some implementations, each receiving peer server device checks whether the communication link is enabled, and if so, sends the configuration information over the communication link. In the case of both peer server devices receiving the configuration information, each peer server device sends the configuration information to the other peer server device, e.g., in opposite directions over the communication link. In the case of only one peer server device receiving the configuration information, the receiving (first) peer server device sends the information to the non-receiving (second) peer server device over the communication link. In some implementations, the receiving peer server device does not send the configuration information to the other peer server device over the communication link if the configuration information is rejected by that receiving peer server device, e.g., if the configuration information is considered invalid due to reasons described above for edge server devices.

In block 1512, one or more peer server devices check information received over the communication link and synchronize the configurations on the peer server devices, e.g., where the synchronization causes the same network configuration to be provided on both of the peer server devices. In the case where two peer server devices sent their received configuration information over the communication link to the other peer device, each peer server device compares the configuration information received over the communication link from the other peer server device to the configuration information received from the edge configuration device to confirm that these sets of configuration information match. If such a match is confirmed by both peer server devices, then both peer server devices are known to have received the same configuration information and are synchronized.

In the case where only one (first) peer server device received the configuration information from the edge configuration device and sent the configuration information over the communication link to a second peer server device, the second peer server device can compare the configuration information to the current network configuration on the second peer server device and determine whether the configuration information is acceptable, e.g., whether there are any conflicts or other conditions not allowing the configuration described by the received configuration information to be used, which can be similar to edge server device 202 determining whether a requested configuration is allowed as described above. For example, the configuration information may indicate to define a switched UNI on the second peer server device that uses a particular type of VLAN. If a VLAN of a different type already exists on the second peer server device, then that switched UNI cannot be created on that peer server device. In another example, there may not be adequate resources to create the switched UNI, e.g., the second peer server device may only be able to create predetermined number of VLANs and that number has already been reached, there may not be enough memory available to support VLAN creation or UNI creation, etc.

If no conflicts exist, the second peer server device creates a configuration in its memory according to the configuration information received over the communication link, e.g., creates a switched UNI and the VLANs (and VLAN-ISID bindings) indicated in the configuration information which mirrors the configuration of the first peer server device, and sends an acceptance to the first peer server device over the communication link. The first peer server device (and/or the second peer server device) can then send an acceptance back to the edge configuration device indicating that the configuration information is acceptable and valid for the edge server device. The edge configuration device can then configure itself according the configuration information to allow access to the SPB network by the associated end device, e.g., create VLANs, port memberships, port tagging, etc. (e.g., provision one or more network services (or virtual services) for the associated end device).

If one or more conflicts exist, the second peer server device cannot create the configuration indicated by the configuration information and sends a rejection back to the first peer server device over the communication link. To synchronize the peer server devices, the first peer server device removes the configuration from its memory, e.g., rejects the configuration of VLANs and switched UNIs indicated by the configuration information, and sends a rejection to the edge configuration device. The edge configuration device then knows that the configuration information is not currently valid for the edge server device, and the edge configuration device can clear any settings or configuration from its memory and send a message to the associated end device similarly as described above.

Figure 16:
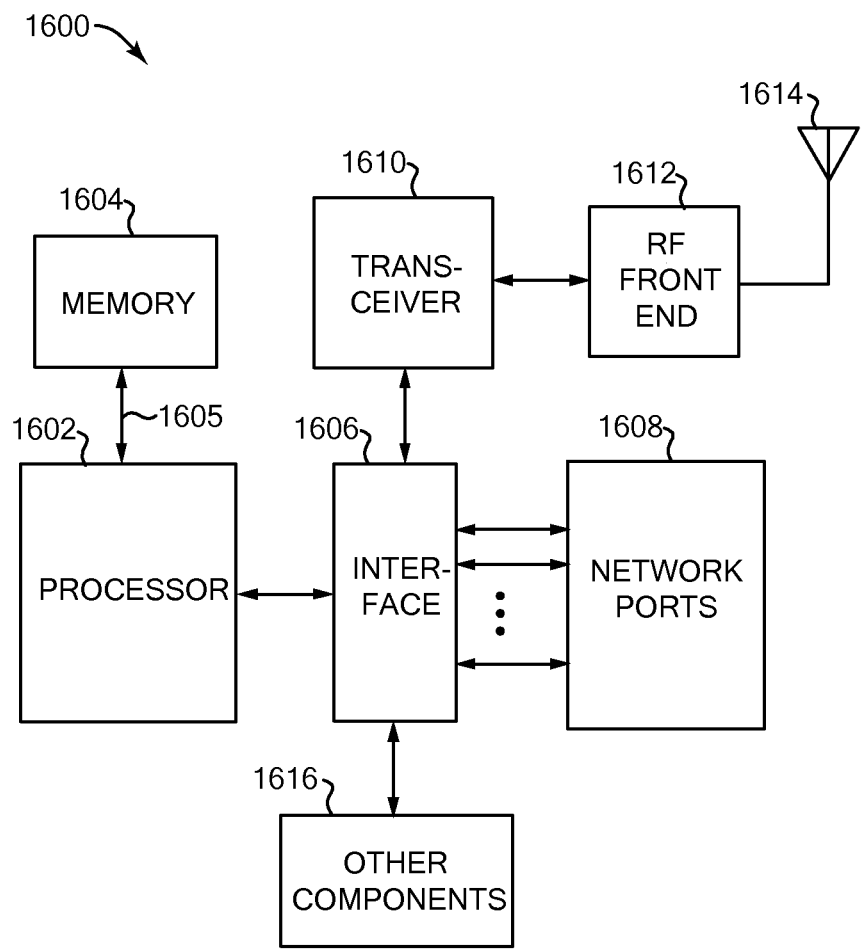
FIG. 16 illustrates a block diagram of an example device which may be used to implement some features described herein.

FIG. 16 illustrates a block diagram of an example device which may be used to implement some features described herein. Device 1600 can be, for example, an edge configuration device 204, an end device 206, 208, or 210 (e.g., a wireless access point 104 or other client device), a wireless controller 110 or other type of network device, etc., as shown in the examples of FIGS. 1 and 2. In some implementations, device 1600 can be an edge server device 202 or a peer server device 1410 or 1412 as shown in the example of FIG. 14. In a basic configuration, device 1600 typically includes one or more processors 1602 and a system memory 1604. A memory bus 1605 can be used for communicating between processor 1602 and system memory 1604.

Depending on the desired configuration, processor 1602 can be of any type of processing circuitry including but not limited to one or more microprocessors, microcontrollers, digital signal processors (DSPs), application specific integrated circuits (ASICs), or any combination thereof. In some examples, processor 1602 can include one or more levels of caching, a processor core, and registers. An example processor core can include an arithmetic logic unit (ALU), a floating point unit (FPU), a digital signal processing core (DSP), or any combination thereof. A memory controller can also be used with processor 1602, or, in some implementations, a memory controller can be an internal part of processor 1602.

System memory 1604 can store data used in the operation of the device 1600. For example, system memory 1604 can store an operating system for the device, one or more applications for the device, and program data. In some implementations, the memory 1604 can store software operative to perform network device functionality as well as read the instructions sent by an administrator or other user to the device and perform other functions as described above, including reading and executing commands and parameters, receiving information from associated network devices, and performing blocks of methods described herein using one or more processors. For example, profiles providing configurations for network devices can be stored in memory 1604. Alternatively, the software can be implemented as hardware or a combination of hardware and software. Memory 1604 can be implemented as one or more of various types, volatile and/or non-volatile, including RAM, ROM, EEPROM, flash memory or other memory technology, etc.

An interface 1606 can be used to interface the processor 1602 with other functional components of the device 1600. Such other components can include network ports 1608 of the device 1600 which are connected to other devices on one or more networks to allow communication of data to and from other network devices. For example, Ethernet, Universal Serial Bus (USB), or other types of ports can allow wired network communication to the device 1600. In some types of devices (e.g., a wireless access point), a transceiver 1610 can be connected to interface 1606 to allow transmission and reception of wireless signals at the device 1600. For example, an RF front end 1612 and antenna 1614 can allow transmission and reception of wireless RF signals, as well as conversion between analog signals used in the wireless communication and digital signals used by the device 1600. Signals of other frequencies can be communicated in other implementations.

Other components 1616 can also be connected to interface 1606. For example, storage devices can be connected to the interface 1606, such as CD-ROM, DVD, or other optical storage, magnetic tape storage, magnetic disk storage or other magnetic storage devices, solid state memory storage, or any other medium which can be used to store the desired information and which can be accessed by device 1600. Any such computer storage media (including memory 1604) can be part of or accessible by device 1600. Example computer storage media can include volatile and nonvolatile, removable and non-removable media implemented in any method or technology for storage of information, such as computer readable instructions, data structures, program modules, or other data.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Various blocks and operations of methods described above can be performed in a different order than shown and/or at least partially simultaneously, where appropriate. For example, some implementations can perform blocks of the methods at various times and/or based on events not related to those described. In some implementations, blocks or operations of the methods can occur multiple times, in a different order, and/or at different times in the methods. In some implementations, the methods can be implemented, for example, on any of various network devices connected to a network.

In general, it should be understood that the circuits described herein may be implemented in hardware using integrated circuit development technologies, or via some other methods, or the combination of hardware and software that could be ordered, parameterized, and connected in a software environment to implement different functions described herein. For example, the implementations may be implemented using a general purpose or dedicated processor running a software application through volatile or nonvolatile memory. Also, the hardware elements may communicate using electrical signals, with states of the electrical signals representing different data. It should be further understood that this and other arrangements described herein are for the purposes of example only. As such, those skilled in the art will appreciate that other arrangements and other elements (e.g., machines, interfaces, functions, orderings, and groupings of functions, etc.) may be used instead, and some elements may be omitted altogether according to the desired results. Further, many of the elements that are described are functional entities that may be implemented as discrete or distributed components or in conjunction with other components, in any suitable combination and location.

Methods and features disclosed herein can be implemented by computer program instructions, software instructions, logic, and/or code, which can be executed on a computer, e.g., implemented by one or more processors, e.g., microprocessors or other processing circuitry, and can be stored on a computer program product including a computer readable medium or computer readable storage medium, e.g., a nontransitory medium, e.g., magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server. Alternatively, methods and features can be implemented in hardware (logic gates, etc.), or in a combination of hardware and software.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural terms and/or singular term herein, those having ordinary skill in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those skilled in the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those of ordinary skill in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense that one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Any suitable programming language may be used to implement the routines of particular embodiments including C, C++, Java, assembly language, etc. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" (e.g., processing circuit) includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A method comprising:
   requesting a management server from an end device upon connection of the end device to a shortest path bridging (SPB) network for SPB configuration information for the end device to communicate on the SPB network, wherein the end device communicates with the management server over a non-SPB network connection, wherein the end device is a non-SPB device that is not compatible with the SPB network and includes a first fabric attach agent for processing networking configuration messages;
   receiving, by the end device, the SPB configuration information from the management server, wherein the SPB configuration information received from the management server includes one or more bindings mapping one or more virtual local area networks (VLANs) to one or more service identifiers (ISIDs) for the end device; and
   sending, by the end device, the SPB configuration information to an edge configuration device connected to the end device, wherein the edge configuration device includes a second fabric attach agent, and wherein the SPB configuration information causes configuration of the edge configuration device to allow communication of the end device on the SPB network.

2. The method of claim 1 wherein the requesting for SPB configuration information includes sending identity information to the management server, the identity information identifying the end device or one or more users associated with the end device.

3. The method of claim 1 wherein the configuring of the edge configuration device includes creating the one or more VLANs for the end device on the edge configuration device as indicated by the SPB configuration information, and creating one or more port memberships of the one or more VLANs for the end device.

4. The method of claim 1 wherein the configuring of the SPB network for the end device includes establishing port tagging status on one or more ports of the edge configuration device connected to an edge server device.

5. The method of claim 1 wherein the end device communicates with the management server over a wireless network and registers with the management server.

6. A device comprising:
a memory; and
at least one processor configured to access the memory and perform operations comprising:
requesting a management server from an end device upon connection of the end device to a shortest path bridging (SPB) network for SPB configuration information for the end device to communicate on the SPB network, wherein the end device communicates with the management server over a non-SPB connection, wherein the end device is a non-SPB device that is not compatible with the SPB network and includes a first fabric attach agent for processing networking configuration messages;
receiving the SPB configuration information from the management server, wherein the SPB configuration information received from the management server includes one or more bindings mapping one or more virtual local area networks (VLANs) to one or more service identifiers (ISIDs) for the end device; and
sending the SPB configuration information to an edge configuration device connected to the end device, wherein the edge configuration device includes a second fabric attach agent, and wherein the SPB configuration information causes configuration of the edge configuration device to allow communication of the end device on the SPB network.

7. The device of claim 6 wherein the requesting for SPB configuration information includes sending identity information to the management server, the identity information identifying the end device or one or more users associated with the end device.

8. The device of claim 6 wherein the configuring of the edge configuration device includes creating the one or more VLANs for the end device on the edge configuration device as indicated by the SPB configuration information, and creating one or more port memberships of the one or more VLANs for the end device.

9. The device of claim 6 wherein the configuring of the SPB network for the end device includes establishing port tagging status on one or more ports of the edge configuration device connected to an edge server device.

10. The device of claim 6 wherein the end device communicates with the management server over a wireless network and registers with the management server.

11. A computer program product comprising a non-transitory computer-readable medium including program instructions to be implemented by a device connected to a communication network, the program instructions performing operations including:
requesting a management server from an end device upon connection of the end device to a shortest path bridging (SPB) network for SPB configuration information for the end device to communicate on the SPB network, wherein the end device communicates with the management server over a non-SPB connection, wherein the end device is a non-SPB device that is not compatible with the SPB network and includes a first fabric attach agent for processing networking configuration messages;
receiving the SPB configuration information from the management server, wherein the SPB configuration information received from the management server includes one or more bindings mapping one or more virtual local area networks (VLANs) to one or more service identifiers (ISIDs) for the end device; and
sending the SPB configuration information to an edge configuration device connected to the end device, wherein the edge configuration device includes a second fabric attach agent, and wherein the SPB configuration information causes configuration of the edge configuration device to allow communication of the end device on the SPB network.

12. The computer program product of claim 11 wherein the configuring of the edge configuration device includes creating the one or more VLANs for the end device on the edge configuration device as indicated by the SPB configuration information, and creating one or more port memberships of the one or more VLANs for the end device.

13. The computer program product of claim 11 wherein the configuring of the SPB network for the end device includes establishing port tagging status on one or more ports of the edge configuration device connected to an edge server device.

* * * * *